(12) United States Patent
Moyer et al.

(10) Patent No.: US 10,776,267 B2
(45) Date of Patent: Sep. 15, 2020

(54) MIRRORED BYTE ADDRESSABLE STORAGE

(71) Applicant: Red Hat, Inc., Raleigh, NC (US)

(72) Inventors: Jeffrey E. Moyer, Carlisle, MA (US); Vivek Goyal, Westford, MA (US)

(73) Assignee: Red Hat, Inc., Raleigh, NC (US)

( * ) Notice: Subject to any disclaimer, the term of this patent is extended or adjusted under 35 U.S.C. 154(b) by 191 days.

(21) Appl. No.: 15/837,902

(22) Filed: Dec. 11, 2017

(65) Prior Publication Data

US 2019/0179750 A1    Jun. 13, 2019

(51) Int. Cl.
  *G06F 12/0804* (2016.01)
  *G06F 3/06* (2006.01)
  *G06F 11/20* (2006.01)

(52) U.S. Cl.
  CPC .......... *G06F 12/0804* (2013.01); *G06F 3/065* (2013.01); *G06F 3/0619* (2013.01); *G06F 3/0685* (2013.01); *G06F 11/2069* (2013.01); *G06F 2212/1032* (2013.01); *G06F 2212/205* (2013.01)

(58) Field of Classification Search
  CPC ............. G06F 11/2041; G06F 11/2043; G06F 12/0866; G06F 12/0815
  See application file for complete search history.

(56) References Cited

U.S. PATENT DOCUMENTS

| 6,230,240 B1 | 5/2001 | Shrader et al. |
| 6,516,380 B2 | 2/2003 | Kenchammama-Hoskote et al. |
| 7,500,070 B2 | 3/2009 | Schilling et al. |
| 8,065,479 B2 * | 11/2011 | Humlicek ........... G06F 12/0804 711/113 |
| 2004/0019821 A1 | 1/2004 | Chu et al. |
| 2006/0235909 A1* | 10/2006 | Oks ...................... G06F 11/1471 |
| 2007/0180312 A1* | 8/2007 | Rhodes ............... G06F 11/2023 714/13 |
| 2010/0199042 A1* | 8/2010 | Bates ................... G06F 11/2064 711/114 |
| 2014/0195480 A1 | 7/2014 | Talagala et al. |
| 2015/0012699 A1* | 1/2015 | Rizzo .................. G06F 12/0866 711/113 |
| 2016/0179375 A1* | 6/2016 | Kirvan ................ G06F 12/0246 711/153 |

FOREIGN PATENT DOCUMENTS

WO    2015134941    9/2015

\* cited by examiner

*Primary Examiner* — Jigar P Patel
(74) *Attorney, Agent, or Firm* — K&L Gates LLP

(57) ABSTRACT

Mirrored byte addressable storage is disclosed. For example, first and second persistent memories store first and second pluralities of pages, both associated with a plurality of page states in a mirror state log in a third persistent memory. A mirror engine executing on a processor with a processor cache detects a write fault associated with the first page of the first plurality of pages and in response, updates a first page state to a dirty-nosync state. A notice of a flush operation of the processor cache associated with first data is received. The first data becomes persistent in the first page of the first plurality of pages after the flush operation; then the first page state is updated to a clean-nosync state. The first data is then copied to the first page of the second plurality of pages; then the first page state is updated to a clean-sync state.

20 Claims, 9 Drawing Sheets

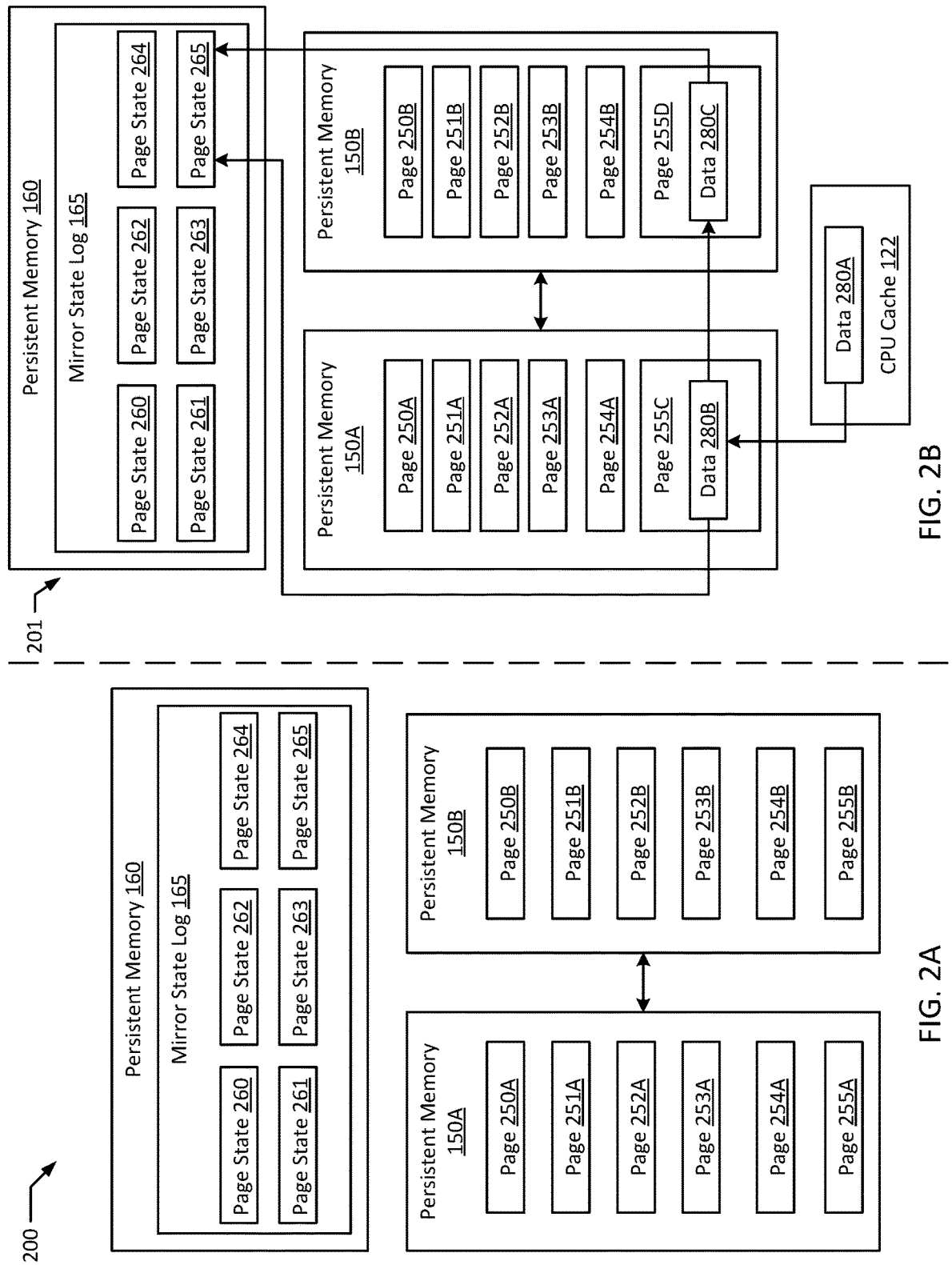

MIRRORED BYTE ADDRESSABLE STORAGE

BACKGROUND

The present disclosure generally relates to storing data in computing devices. Computer systems generally employ a processor connected to a memory for fast access to data currently in use and a secondary storage device for the long term storage of data. Typically, memory storage may be provided by dynamic random access memory ("DRAM") modules, where data stored in such memory is wiped out when the computer system is powered down as the data is stored in the charge state of the memory. Typically, long term storage is non-volatile, such that data is stored even without power running through the system. In typical examples, long term storage may be provided by non-volatile storage, such as mechanical hard disk drives ("HDDs"), or non-volatile memory, such as electronically erasable programmable read-only memory ("EEPROM"). In a typical system, the processor may interface and address memory directly, but may access secondary storage through a host bus adapter over a peripheral interconnect. Accessing secondary storage is typically orders of magnitude slower than memory such as DRAM. Data is often transferred to memory from the secondary storage before being acted on directly by a processor. For additional data security and fault tolerance, data in secondary storage may be mirrored or cloned to other storage devices as a backup measure.

SUMMARY

The present disclosure provides a new and innovative system, methods and apparatus for mirrored byte addressable storage. In an example, a system has a first persistent memory, a second persistent memory, and a third persistent memory, where a mirror state log is stored in the third persistent memory and the mirror state log stores a plurality of page states associated with a first respective plurality of pages of the first persistent memory and a second respective plurality of pages of the second persistent memory, including a first page state associated with both a first page of the first plurality of pages and a first page of the second plurality of pages, and a second page state associated with both a second page of the first plurality of pages and a second page of the second plurality of pages. A mirror engine executes on one or more processors, where a processor cache is associated with the one or more processors. A first write fault associated with the first page of the first plurality of pages is detected. In response to detecting the first write fault, the first page state is updated to a dirty-nosync state, where each page state of the plurality of page states is one of a clean-sync state, the dirty-nosync state, and a clean-nosync state. A notice of a flush operation of the processor cache associated with first data is received. A value of the first data is restricted from being updated to the first plurality of pages during the flush operation and the first data becomes persistent in the first page of the first plurality of pages after completion of the flush operation. In response to the first data becoming persistent in the first plurality of pages, the first page state is updated to the clean-nosync state. In response to updating the first page state to the clean-nosync state, the first data is copied to the first page of the second plurality of pages. In response to storing the first data to the first page of the second plurality of pages, the first page state is updated to the clean-sync state.

Additional features and advantages of the disclosed method and apparatus are described in, and will be apparent from, the following Detailed Description and the Figures.

BRIEF DESCRIPTION OF THE FIGURES

FIG. 2A is a block diagram illustrating data storage in a mirrored byte addressable storage system according to an example of the present disclosure.

FIG. 2B is a block diagram illustrating data replication in a mirrored byte addressable storage system according to an example of the present disclosure.

DETAILED DESCRIPTION OF EXAMPLE EMBODIMENTS

Figure 1:
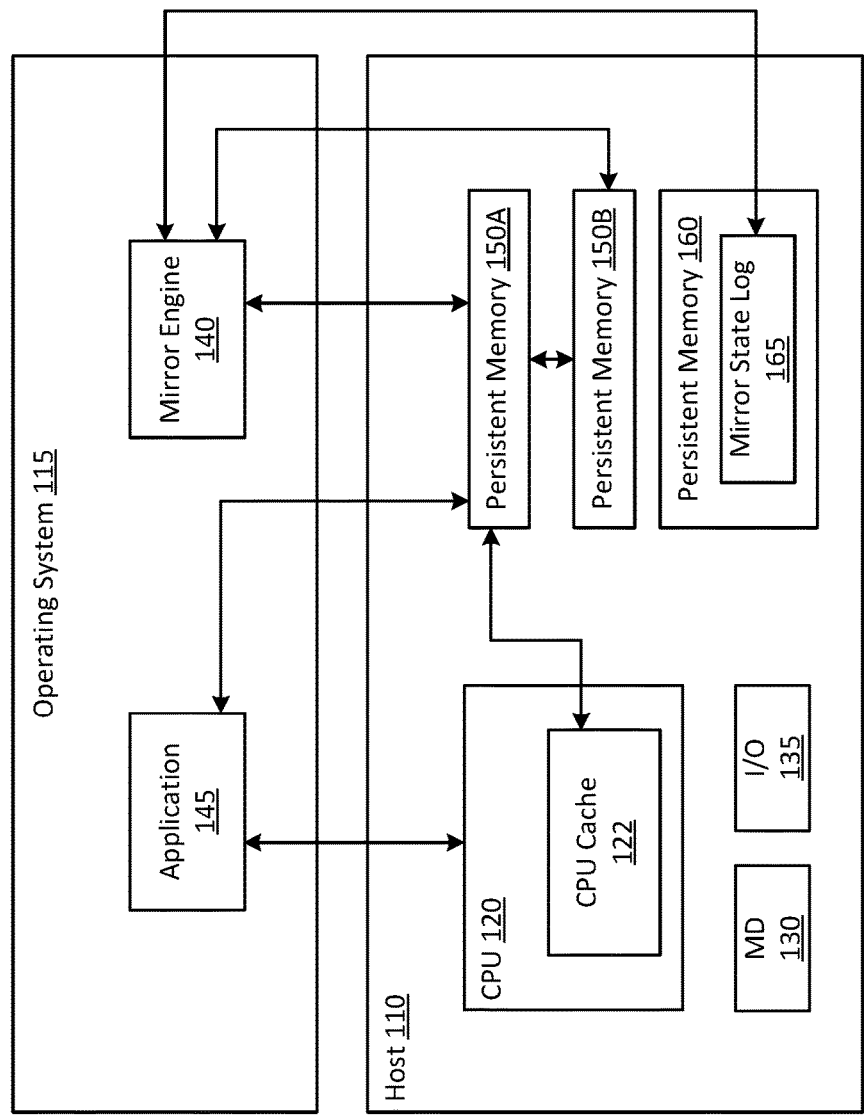
FIG. 1 is a block diagram of a mirrored byte addressable storage system according to an example of the present disclosure.

In typical computer system architectures, one or more processors (e.g., central processing units ("CPUs") or graphics processing units ("GPUs")) may be connected to memory devices (e.g., DRAM) and secondary storage devices (e.g., hard disk drives ("HDDs"), solid state drives ("SSDs"), EEPROM). In an example, a CPU may directly address memory, while secondary storage may be accessed via a host bus adapter over a peripheral interconnect. Typically, memory may be organized for data storage in page form, data being accessed directly by the processor, while secondary storage may be organized in storage blocks accessed via block commands. In an example, data may be moved between a memory device and a secondary storage device using direct memory access without necessarily requiring involvement by the CPU. In a typical example, because secondary storage is typically significantly slower than memory, and due to the block oriented storage structure of such secondary storage, caching layers are used in both the CPU and an operating system (e.g. Red Hat Enterprise Linux®) executing on the CPU to speed up access to data in the secondary storage.

In a typical example, an operating system cache, sometimes known as a page cache, tracks data storage on a per-file (or per-inode) basis. In an example, an application executing on the CPU may open a file and map portions of the file into the application's address space. However, the application would not typically map the file data directly from secondary storage, instead, space may be allocated in the page cache, and the page cache pages may in turn be mapped into the application's address space. Rather than transferring data preemptively out of secondary storage, such data transfer may typically be performed on demand, such that when, for example, the application attempts to access a mapped page before data is transferred from the secondary storage, a read fault is generated on the mapped page, resulting in a trap into the kernel that in turn results in the file system arranging for block input/output ("I/O") transfers from the secondary storage to the page cache pages.

Many storage device implementations, especially in enterprise environments, are typically part of systems that include replication of data to prevent against data loss due to a failure in any one physical storage device. This replication may be implemented through a redundant array of independent disks ("RAID") setup, where multiple independent storage devices are combined into a single logical device. RAID arrays may be designed to increase performance, to provide live data backup, or a combination of both. For example, storage throughput may be increased by simultaneously executing two storage operations on two separate disks in a RAID array, storing two files in the time it takes one disk to store one file (e.g., RAID 0). Similarly, two copies of the same file may be stored on two different disks resulting in automated backup and replication (e.g., RAID 1). RAID 1 is typically also known as data mirroring, and is a common configuration for delivering high performance, highly data redundant storage. In a RAID array designed for data security through replication, each piece of data on a given storage device may be saved in duplicate across at least two physical devices so that if one device fails, the data on that device may be reconstructed from the remaining copies.

A RAID array may also be configured such that, while two copies of each file are being written to storage devices, more total devices are available for use, therefore simultaneously enabling higher throughput and automated replication. A typical storage device (e.g., network attached storage ("NAS"), storage area network ("SAN")) may include numerous storage devices such as HDDs and SSDs that may be arranged in a RAID array to prevent against the failure of any one device. For example, a NAS device with three HDDs arranged in a RAID array may store two logical copies of the same data on the three combined disks so that failure of any one HDD can be recovered from by replacing that HDD and recreating the data on it from the other two devices. A common RAID implementation for a storage node may be what is known as RAID 5 or RAID 6, where an "exclusive or" calculation is used to back up each bit stored to an array. In a RAID 5 example. with the algorithm, a parity bit may be stored on one drive in the array calculated from each bit in the same position on the other drives of the array. This is made possible due to the binary nature of data storage, where every bit is either a 0 or a 1. In a simplified example for visualization purposes, device 1 may store a 1, and device 2 may store a 0. In the example, because the data in device 1 and device 2 is different, a 1 is stored on device 3. Therefore if device 2 fails, you can calculate that since you know that device 1 had different data from device 2 due to the 1 stored on device 3, device 2 must have had a 0. Therefore the data on disc 2 can be recreated if disc 2 fails and requires replacement. Since the order of the devices is known, one device can always store the result of a chain of "exclusive or" operations and therefore only the effective capacity of one disc needs to be used to store a "backup" of every other corresponding bit on the other drives. A 3 device RAID 5 array therefore results in a 33% replication overhead, while a 5 device RAID 5 array only requires 1 of the 5 devices' capacity to be lost, resulting in 20% replication overhead. However, as arrays increase in size, a second parity bit may be advantageous to guard against the possibility of losing a second device to failure before the first failed device is reconstructed, at the cost of another device worth of overhead on the array (e.g., RAID 6).

In a typical system, a RAID configuration may be implemented in any of multiple layers of the storage stack, including as both software and hardware implementations. RAID algorithms and replication may be performed by a dedicated hardware RAID array, either attached to or external to a computer server. The RAID algorithms may also be implemented in host bus adapter firmware, either for direct attached storage via, for example, peripheral component interconnect ("PCI") connections, or for NAS or SAN storage via, for example, network cards and/or fiber channel cards. In some examples, RAID may also be implemented by software at the kernel level via a kernel device driver, or even at an application level. RAID implementations may also leverage a combination of these various software and hardware interposition points where storage data may be diverted. RAID implementations may typically be used to deliver improved redundancy and/or throughput to storage devices, and persistent memory devices exhibit many of the same behavioral and functional characteristics as more typical storage devices.

Persistent memory is a relatively new technology that may sometimes be considered a third tier of storage, between traditional memory devices and storage devices in performance, with some functional similarities to both. In typical examples, persistent memory attempts to combine the advantages of traditional memory devices (e.g., fast, low-latency, direct access by CPUs) with the advantages of storage devices (e.g., data persists after power down). Storage devices where data remains stored in the absence of power are typically known as "non-volatile" storage devices. Persistent memory may be implemented in a variety of ways, a rudimentary example being a traditional memory device (e.g., DRAM) wired to a non-volatile EEPROM device (e.g., flash memory) with an additional temporary power source. In such an example, the persistent memory device may be accessed by the CPU via the traditional memory device's interface, but may be configured to, for example, utilize the temporary power source (e.g., a battery or a capacitor) to store the contents of the traditional memory device to the EEPROM device (e.g., flash memory) when a power failure of main power is detected. Persistent memory implementations may be known as Non-Volatile Dual In-line Memory Modules ("NVDIMMs"). An NVDIMM may be configured to copy data to its non-volatile component (e.g., EEPROM, flash memory) without the computer system being aware of such backup procedures. Such NVDIMMs may be implemented with attached flash storage or onboard flash storage, and may additionally access block-oriented flash memory as a memory cache. Alternative forms of persistent memory may also be implemented, for example, traditional DRAM backed up by battery power may be persistent for the duration of the battery's charge, with the battery being charged while the system is powered on. In an example, persistent memory may be implemented with any form of suitable non-volatile memory, including flash memory, nano random access memory ("NRAM"), nanocrystal wire-based memory, silicon-oxide based sub-10 nanometer process memory, graphene memory, Silicon-Oxide-Nitride-Oxide-Silicon ("SONOS"), resistive random-access memory ("RRAM"), programmable metallization cell ("PMC"), conductive-bridging RAM ("CBRAM"), magneto-resistive RAM ("MRAM"), spin-transfer torque RAM ("STT-RAM"), dynamic RAM ("DRAM"), phase change RAM ("PCM" or "PRAM"), or other non-volatile solid-state storage media, also known as solid state drives ("SSDs"). In other examples, nonvolatile memory associated with persistent memory may be implemented with magnetic media, optical media, or other types of non-volatile storage media, for example a hard disk drive or an optical storage drive.

The advent of persistent memory introduces significant potential changes to storage architecture. In many examples, persistent memory may be implemented to provide non-volatile storage that bypasses the host bus adapters used to access traditional storage devices, resulting in bypassing a commonly used interposition point for RAID replication of long term data storage (for example, in RAID 1 implementations). Since persistent memory is often implemented to connect to a computer system via a DRAM interface, the whole storage stack in a traditional kernel may be bypassed. The persistent memory may then be directly mapped into an application's address space, with loads and stores to and from persistent memory bypassing the kernel's involvement completely after page faults are resolved. This form of direct mapping to persistent memory is known as direct access ("DAX") and allows for byte-level access to non-volatile media plugged into the memory bus of the computer system. DAX may allow for significant throughput advantages as compared to traditional block based storage access, offering very large performance improvements for a variety of time sensitive operations, for example, web search. For example, accessing a high performance solid state drive through a block based interface may take two orders of magnitude more time than DAX access to persistent memory. A cost of implementing DAX, however, is that many typical replication solutions (e.g., legacy RAID implementations) no longer work because the data being stored never hits the storage stack and/or RAID driver. RAID implementations may alternatively be implemented at the application level on a per application basis, being triggered by the application itself, perhaps through the use of a shared library in some cases, but such implementations lack the uniformity and assurance of robust, redundant storage provided by system wide mirroring implementations.

The present disclosure aims to address the loss of interposition points for RAID drivers by implementing mirrored byte addressable storage through the implementation of a new interposition point in a portable, software based mirroring system that may be retrofit into existing systems transitioning to persistent memory based storage. In a typical example, once a DAX mapping is established, an application may store data without the involvement of the operating system, by using CPU store instructions. Because stores to main memory (and hence persistent memory) are typically cached by the CPU, applications may optimally take steps to ensure that stored data is durable or persistent (e.g. the data survives power failure). This is typically accomplished by issuing a sequence of CPU instructions which may vary depending on CPU architecture. Common steps in achieving storage durability or persistence may include a "flush" operation where the contents of CPU caches are sent to memory, followed by a "fence" operation committing the "flushed" data to memory. Many file systems also require making any metadata affected by the "flush" and/or the "fence" operation durable, for example, through a memory sync call (e.g., msync). In systems requiring the commitment of metadata, the memory sync call provides an interposition point that may be leveraged by a software RAID driver in DAX programming models. In an example, a mirror engine in a mirrored byte addressable storage system may be notified of the memory sync call and may perform storage mirroring, for example, as part of the memory synchronization process. Therefore, the performance advantages of DAX programming and persistent memory may be realized while retaining the data security offered by mirrored storage in a RAID-like implementation, without any disk based storage.

FIG. 1 is a block diagram of a mirrored byte addressable storage system according to an example of the present disclosure. The system 100 may include one or more hosts (e.g., host 110). Host 110 may be a physical host or a virtual host, similarly, operating system 115 (e.g., Red Hat Enterprise Linux®) may be either a host operating system or a guest operating system. Host 110 may in turn include one or more physical processors (e.g., CPU 120) communicatively coupled to memory devices (e.g., MD 130), input/output devices (e.g., I/O 135), and persistent memory devices (e.g., persistent memories 150A-B and 160). In an example, another persistent memory device may be substituted for memory device 130. As used herein, physical processor or processors 120 refer to devices capable of executing instructions encoding arithmetic, logical, and/or I/O operations. In one illustrative example, a processor may follow a Von Neumann architectural model and may include an arithmetic logic unit (ALU), a control unit, and a plurality of registers. In an example, a processor may be a single core processor which is typically capable of executing one instruction at a time (or processing a single pipeline of instructions), or a multi-core processor which may simultaneously execute multiple instructions. In another example, a processor may be implemented as a single integrated circuit, two or more integrated circuits, or may be a component of a multi-chip module (e.g., in which individual microprocessor dies are included in a single integrated circuit package and hence share a single socket). A processor may also be referred to as a central processing unit ("CPU"). In an example, CPU 120 may be associated with one or more CPU caches (e.g., CPU cache 122). In the example, CPU cache 122 may be high speed memory closely located to CPU 120, where data for imminent processing by CPU 120 may be loaded to enhance processing times. In an example, data for a future instruction to be processed by CPU 120 may be pre-loaded in CPU cache 122, and processing results from CPU 120 may be stored in CPU cache 122 until such data is transferred from or "flushed" from CPU cache 122 to memory device 130 and/or persistent memory 150A.

As discussed herein, a memory device 130 refers to a volatile or non-volatile memory device, such as RAM, ROM, EEPROM, or any other device capable of storing data. As discussed herein, I/O device 135 refer to devices capable of providing an interface between one or more processor pins and an external device, the operation of which is based on the processor inputting and/or outputting binary data. CPU 120 may be interconnected using a variety of techniques, ranging from a point-to-point processor interconnect, to a system area network, such as an Ethernet-based network. Local connections within each physical host 110, including the connections between a processor 120 and a memory device 130 and between a processor 120 and an I/O device 135 may be provided by one or more local buses of suitable architecture, for example, peripheral component interconnect ("PCI"). In an example, persistent memories 150A-B and 160 may be implemented with any suitable hardware, including but not limited to any combination of flash memory, nano random access memory ("NRAM"), nanocrystal wire-based memory, silicon-oxide based sub-10 nanometer process memory, graphene memory, Silicon-Oxide-Nitride-Oxide-Silicon ("SONOS"), Resistive random-access memory ("RRAM"), programmable metallization cell ("PMC"), conductive-bridging RAM ("CBRAM"), magneto-resistive RAM ("MRAM"), spin-transfer torque RAM ("STT-RAM"), dynamic RAM ("DRAM"), phase change RAM ("PCM" or "PRAM"), other non-volatile solid-state storage media, magnetic media, optical media, hard disk drive or optical storage drive. Persistent memories 150A-B and 160 may be connected to processor 120 through any suitable interface including memory bus.

In an example, host 110 may be a physical host or a virtual host implemented using any suitable form of virtualization (e.g., a virtual machine ("VM") or a container). A virtual host 110 may execute directly on a physical host or with a hypervisor and/or host operating system between the physical host and the virtual host 110. In an example, operating system 115 may support metadata updates and commitments in relation to data being written to persistent memory 150A. In an example, mirror state log 165 may be any form of suitable storage for a synchronization state of the various storage subunits in persistent memories 150A-B (e.g., pages, blocks).

In an example, mirror engine 140 may be implemented via any form of executable code (e.g., executable file, script, application, service, daemon). In an example, mirror engine 140 orchestrates the synchronization of data between persistent memories 150A-B in conjunction with mirror state log 165 which stores the current synchronization state between persistent memories 150A-B. In an example, mirror engine 140 may also reconcile and recover data between mirror nodes (e.g., persistent memories 150A-B) upon a failure of application 145, operating system 115, or host 110. In an example, mirror engine 140 may also recover data from one or more mirror nodes (e.g., persistent memories 150A-B) upon a partial and/or total failure of one or more mirror nodes. In another example, mirror engine 140 may be implemented with any suitable hardware circuitry performing the tasks performed by a software implementation of mirror engine 140. In an example, application 145 may be any form of executable code (e.g., executable file, script, application, service, daemon) that stores data to persistent memory 150A.

FIG. 2A is a block diagram illustrating data storage in a mirrored byte addressable storage system according to an example of the present disclosure. In an example system 200, persistent memory 150A is the primary mirror leg of a two part mirrored storage node, where persistent memory 150B is the secondary mirror leg. In the example, application 145 maps memory pages (e.g., pages 250A-255A) from persistent memory 150A, and mirror engine 140 replicates the data from pages 250A-255A to pages 250B-255B. In an example, each tuple of pages (e.g., pages 250A-B, 251A-B, 252A-B, 253A-B, 254A-B, and 255A-B) is associated with a respective page state (e.g., page states 260-265) in mirror state log 165 on persistent memory 160. In an example, persistent memory 160 may be a separate physical device from persistent memories 150A-B. In another example, persistent memory 160 may be a partition on one of persistent memories 150A-B. In another example, persistent memory 160 may be a logical storage node that is part of a mirrored storage cluster (e.g., mirrored partitions on the physical devices of persistent memories 150A-B, or on other physical devices). In an example, pages 250A-B are associated with page state 260, pages 251A-B are associated with page state 261, pages 252A-B are associated with page state 262, pages 253A-B are associated with page state 263, pages 254A-B are associated with page state 264, and pages 255A-B are associated with page state 265. In an example, persistent memories 150A and 150B are on separate physical devices. In the example, being on separate physical devices guards against loss of data from the failure of any given physical storage device associated with persistent memory 150A or 150B. In another example, persistent memories 150A and 150B are partitions on the same physical device. In the example, being on partitions of the same physical device guards against data loss resulting from corruption of a physical location in persistent memory 150A or 150B storing data, but may not guard against data loss from the failure of the entire physical storage device.

FIG. 2B is a block diagram illustrating data replication in a mirrored byte addressable storage system according to an example of the present disclosure. Example system 201 is an updated state of example system 200, where data 280A from CPU cache 122 is being written to page 255A of pages 250A-255A, thereby changing page 255A to updated page 255C. In an example, data 280A may be processing results from CPU 120 of an instruction for application 145. In the example, after a copy of data 280A (e.g., data 280B) is written to page 255C, an update may be made to page state 265 in mirror state log 165, for example, based on mirror engine 140 receiving notice that an update is being made to page 255C to indicate that page 255C is in the process of being updated. In an example, page state 265 is again updated to indicate that page 255C is finished updating. In an example, as a result of the second change in state of page state 265, mirror engine 140 initiates the copying of data 280B to page 255B as data 280C, resulting in the conversion of page 255B to data 255D. In the example, another update may be made to page state 265 upon completion of the copying of data 280C to indicate that pages 255C and 255D are once again synchronized after being updated.

Figure 2C:
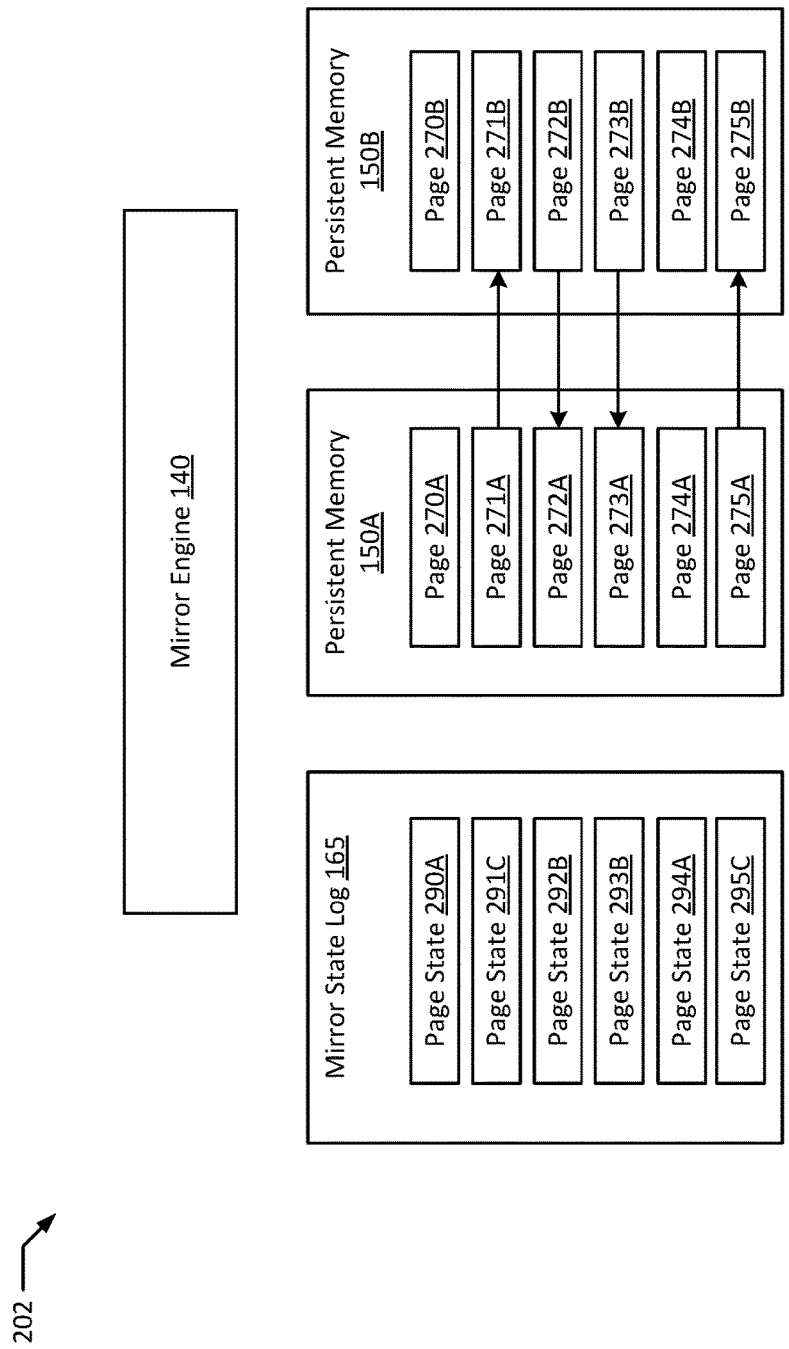
FIG. 2C is a block diagram illustrating data recovery in a mirrored byte addressable storage system according to an example of the present disclosure.

FIG. 2C is a block diagram illustrating data recovery in a mirrored byte addressable storage system according to an example of the present disclosure. Example system 202 may depict a separate region in mirrored persistent memories 150A-B, storing pages 270A-275A and pages 270B-275B respectively. In an example, pages 270A-B are associated with page state 290A, pages 271A-B are associated with page state 291C, pages 272A-B are associated with page state 292B, pages 273A-B are associated with page state 293B, pages 274A-B are associated with page state 294A, and pages 275A-B are associated with page state 295C. In an example, page states 290A and 294A are in the same state, page states 291C and 295C are in the same state, and page states 292B and 293B are in the same page state. In an example, page states 290A, 291C, 292B, 293B, 294A, and 295C may be used to determine appropriate recovery procedures for pages 270A-275A and 270B-275B in the event of a failure of application 145, operating system 115, host 110, persistent memory 150A, and/or persistent memory 150B. In the illustrated example system 202, page states 290A and 294A indicate that their associated data (e.g., pages 270A-B and 274A-B) have the same data so that no action is required with respect to these pages. Page states 291C and 295C indicate that data in the primary mirror leg (e.g., persistent memory 150A) has been successfully updated but not yet replicated, and therefore the proper recovery procedure for these pages is to copy data from page 271A to page 271B, and from page 275A to page 275B. Page states 292B and 293B indicate that data was not successfully updated to the primary mirror leg before the failure, and therefore the proper recovery procedure for these pages is to roll back the attempted changes to persistent memory 150A by copying the previous iteration of the respective pages (e.g., pages 272B and 273B) back to persistent memory 150A from persistent memory 150B as pages 272A and 273A.

In an example, page state 290A is in a clean-sync state indicating that the first page of the first plurality of pages (e.g., page 270A of persistent memory 150A) is synchronized with the first page of the second plurality of pages (e.g., page 270B of persistent memory 150B). In the example, page state 292B is in the dirty-nosync state indicating that the second page of the first plurality of pages (e.g., page 272A of persistent memory 150A) is being updated. In the example, page state 291C is in the clean-nosync state indicating that the third page of the second plurality of pages (e.g., page 271B of persistent memory 150B) is being updated with a change in the first page of the first plurality of pages (e.g., page 271A of persistent memory 150A).

Figure 3:
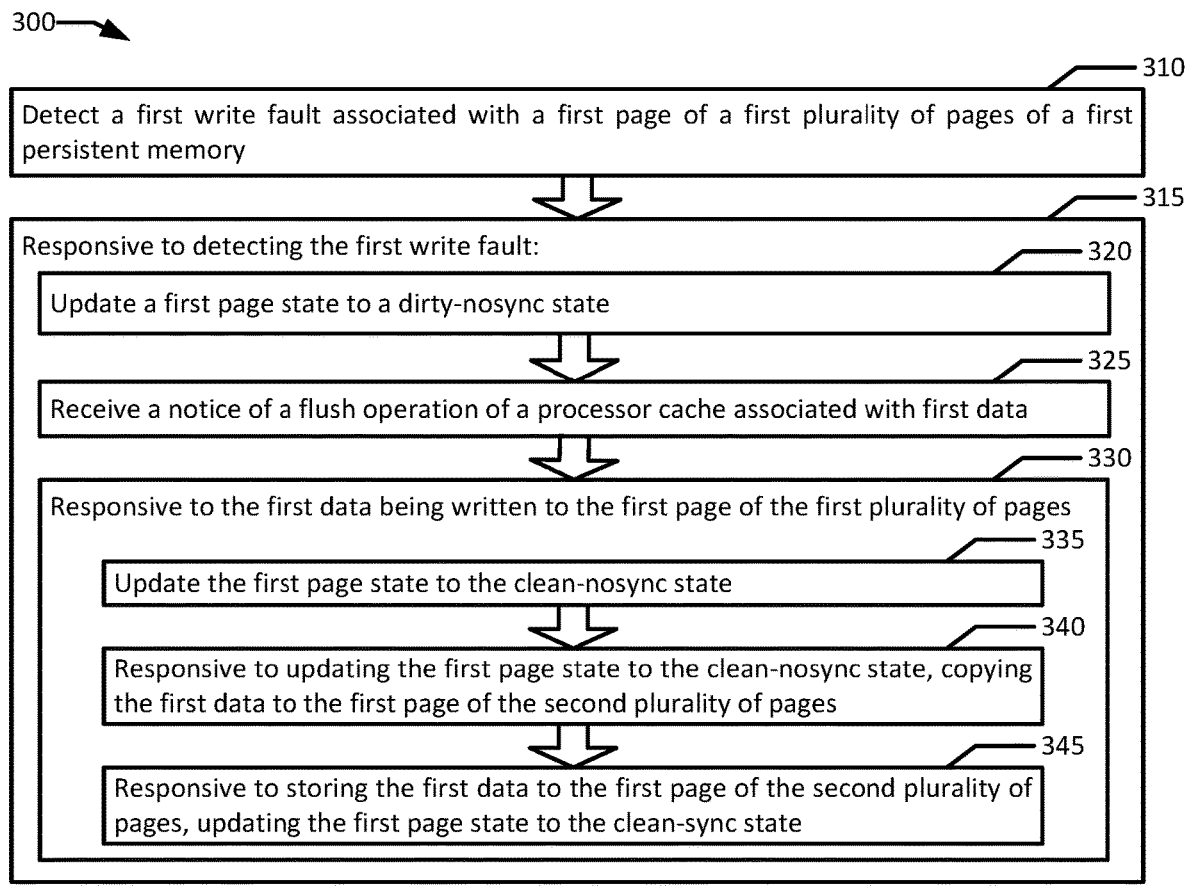
FIG. 3 is a flowchart illustrating an example of mirrored byte addressable storage according to an example of the present disclosure.

FIG. 3 is a flowchart illustrating an example of mirrored byte addressable storage according to an example of the present disclosure. Although the example method 300 is described with reference to the flowchart illustrated in FIG. 3, it will be appreciated that many other methods of performing the acts associated with the method 300 may be used. For example, the order of some of the blocks may be changed, certain blocks may be combined with other blocks, and some of the blocks described are optional. The method 300 may be performed by processing logic that may comprise hardware (circuitry, dedicated logic, etc.), software, or a combination of both. In an example, the method 300 is performed by a mirror engine 140.

Example method 300 may begin with detecting a first write fault associated with a first page of a first plurality of pages of a first persistent memory (block 310). In an example, application 145 executing on CPU 120 may map pages 250A-255A on persistent memory 150A as a data store, where each of mapped pages 250A-255A is flagged as read only, for example by issuing an mmap instruction. In the example, application 145 may request to save data 280A to persistent memory 150A, thereby triggering a write fault on page 255A for violating the read only condition. In an example, mirror engine 140 detects this write fault triggered by application 145. In the example, application 145 triggers the write fault by directly writing data (e.g., data 280A) to persistent memory 150A via a memory interface. In an example, application 145 bypasses an alternative secondary storage interface for committing data 150A to an available durable storage (e.g., HDD, SSD, NAS, SAN). In an example, application 145 selects one of the persistent memories (e.g., persistent memory 150A) to map pages from. In the example, the selected persistent memory 150A may be labeled the primary leg of the mirrored storage system. In another example, host 110 and/or mirror engine 140 may be configured to enforce one persistent memory or other storage device as a primary mirror leg. In an example, mirror engine 140 may be configured to receive notifications when a write fault is incurred in persistent memory 150A, for example by operating system 115. In an example, upon receiving notice that a write fault occurred, the page (e.g., page 255A) where the write fault occurred may be marked as dirty in mirror state log 165 (e.g., page state 265) to indicate an attempted write. In an example, mirror state log 165 may be implemented in any suitable format (e.g., metadata, file, bitmap).

In response to detecting the first write fault, (block 315) a series of actions may be performed. A first page state is updated to a dirty-nosync state (block 320). In an example, each page state of a plurality of page states including the first page state is one of a clean-sync state, the dirty-nosync state, and a clean-nosync state, and the first page state is associated with the first page of the first plurality of pages and a first page of a second plurality of pages of a second persistent memory. In an example, in response to mirror engine 140 detecting the write fault triggered by application 145 updating page 255A, page state 265 is updated to the dirty-nosync state. In an example, prior to being updated to the dirty-nosync state, page state 265 was in the clean-sync state, and the write fault causes the transition from clean-sync to dirty-nosync. In an example, these page states 260-265 in mirror state log 165 may be additional to a broader concept of dirty vs. clean for mapped primary mirror leg persistent memory 150A, in that host 110 may be configured to consider page 255A (and updated page 255C) to be dirty until an entire memory sync operation is completed. In an example, the operations of mirror engine 140 may be part of a memory sync operation and therefore host 110 may maintain a fence on updates to page 255C until the replication by mirror engine 140 to page 255D is complete.

In an example, the clean-sync state (e.g., page state 290A) indicates that the first page of the first plurality of pages (e.g., page 270A of pages 270A-275A) is synchronized with the first page of the second plurality of pages (e.g., page 270B of persistent memory 150B). In an example, the dirty-nosync state (e.g., page state 292B) indicates that the second page of the first plurality of pages (e.g., page 272A of pages 270A-275A) is being updated. In an example, the clean-nosync state (e.g., page state 291C) indicates that the third page of the second plurality of pages (e.g., page 271B of persistent memory 150B) is being updated with a change in the first page of the first plurality of pages (e.g., page 271A of pages 270A-275A).

A notice of a flush operation of a processor cache associated with first data is received (block 325). In an example, a value of the first data is restricted from being updated to the first plurality of pages during the flush operation and the first data becomes persistent in the first page of the first plurality of pages after completion of the flush operation. In an example, mirror engine 140 receives notice of a flush operation on CPU cache 122 from operating system 115, for example, due to mirror engine 140 subscribing to notifications of flush operations. In an example, a state of application 145 includes data 280A. In an example, the flush operation that mirror engine 140 receives notice for may be part of a memory synchronization operation (e.g., msync). In an example, mirror engine 140 may also be called as part of the msync operation to replicate and/or restore data as necessary to commit changes in data resulting from the execution of application 145 to durable, non-volatile storage. In an example, committing data to durable non-volatile storage that lasts through power loss may be referred to as the data "reaching the persistence domain." In an example, the memory synchronization operation additionally includes a change freeze operation to prevent conflicting data updates and a durability operation to commit requested data updates (e.g., a "fence" operation). In an example, after completion of the msync operation including the flush operation, data 280B becomes persistent in persistent memory 150A, and page 255A becomes page 255C including data 280B.

In an example, the actual state of whether or not data 280A has been successfully copied to page 255A may be inconsequential to the calling of msync. In an example, metadata such as storage location information of page 255A and page state 265 may require msync to be updated thereby allowing updated page 255C to be retrieved at a later time. In an example, flushing CPU cache 122 of any data related to page 255C helps prevent data inconsistencies, for example due to race conditions in multi-processor systems where more than one processor performs operations on page 255A concurrently. In the example, msync first issues a flush command to ensure that any contents in CPU cache 122 are moved to persistent memory 150A, and then issues a fence command to prevent any other updates to updated page 255C until after all necessary metadata updates are complete. In an example, mirror engine 140's mirroring of page 255C to page 255D may be accomplished during this msync stage as an additional "required" update. In an example, even if a particular update to page 255A (e.g., in relation to data 280A) never brought data into CPU cache 122, flushing and fencing CPU cache 122 may be required to ensure that no competing changes are made to page 255A in the interim. For example, on Intel® systems, application 145 may issue a non-temporal store (movnt), which bypasses the CPU cache 122. However, in such an example, page 255C would still be dirty from the point of view of the mirror engine 140 and mirror state log 165.

When storing data, computer systems are typically configured to enforce a concept of power failure atomicity, that is, changes to storage media are made in a manner where such changes cannot be torn, such that if a power or other type of failure occurs and the write to storage is interrupted, you will either get the old or the new content back upon restart rather than some indeterminate, intermediate state. One typical implementation may be to ensure that data is stored in chunks (e.g., page, block), the size of which are guaranteed to be atomic (and written at once). Another method may be to implement a storage log or journal, where the log or journal is of atomic size and records the storage state of larger, non-atomic data storage units. The flush and fence operation model is a typical method of enforcing atomicity of changes to data storage units such as page 255A, for example, by issuing a cache line write-back (clwb) or cache line flush (clflush) instruction followed by a store fence (sfence) on Intel® CPUs. Similar operations for enforcing atomicity in different computing architectures may be leveraged as a trigger for the mirror engine 140 in other environments.

In response to the first data being written to the first page of the first plurality of pages, (block 330) additional actions may be performed. The first page state is updated to the clean-nosync state (block 335). In an example, upon msync being called to commit the changes of adding data 280B to page 255C, the first operation performed is to flush CPU cache 122 in favor of the primary mirror leg (e.g., persistent memory 150A) and then to issue a store fence. After the flush and fence operations are complete, data 280B is successfully written and durable on persistent memory 150A so page state 265 may be updated to clean-nosync indicating that data 280B has not yet been copied to the mirror leg, persistent memory 150B. In an example, msync may also trigger write-back, causing the mirror engine 140 to copy data 280B to page 255D on mirror leg persistent memory 150B (and any other additional mirror copies configured on an extended system). In an example, the original msync call made after the original write fault may complete execution, thereby clearing an overall dirty state for the memory address range represented by page 255A, only after replication to all mirrors (e.g., data 280B and 280C) is complete and all of the copies of the data are made durable (e.g., by updating page state 265 to the clean-sync state). In an example, within the broader system wide status of dirty vs. clean in relation to saving data 280A, or a range sync for the memory driver of host 110, page state 265 tracks a sub-status associated with the mirror synchronization state of pages 255A and 255B (or updated pages 255C and 255D).

In response to updating the first page state to the clean-nosync state, the first data is copied to the first page of the second plurality of pages (block 340). In an example, data 280B is copied by mirror engine 140 to page 255B as data 280C, changing page 255B to updated page 255D in the secondary leg of the mirror system (e.g., persistent memory 150B). In an example, an independent flush and fence operation may be called on persistent memory 150B, specifically page 255D, for example, by mirror engine 140, to commit and make durable the mirror copy data 280C. In an example, after data 280C is made durable in page 255D on persistent memory 150B, page state 265 may be updated to the clean-sync state once again.

In an example, a secondary leg of the mirror system is another persistent memory (e.g., persistent memory 150B). In another example, secondary leg can be any form of non-volatile storage, with a potential performance loss based on access latency. In an example with a slower non-volatile storage as the secondary leg, changes may be first buffered, for example in a sequential queue, before being committed to the secondary leg.

In an example, page states 260-265 are stored as a plurality of Boolean values. For example, at a minimum two bits may represent the three states of clean-sync, dirty-nosync, and clean-nosync. In an example, a value of "00" may represent clean-sync, "11" may represent dirty-nosync, and "01" may represent clean-nosync. In such an example, the space requirements for mirror state log 165 may be minimally small to the point of being practically insignificant. In another example, additional textual status data may be added to mirror state log 165 at the cost of storage space, for example, a data structure or transaction log which may provide historical data or to implement failure atomic msync. In an example, a third copy of data 280A may be stored on a corresponding page in a non-volatile memory and/or persistent memory. In an example, additional Boolean bits may be added to mirror state log 165 to individually track the synchronization state of each additional secondary mirror leg. In another example, the same two bit Boolean system may be used to track synchronization state as a whole, obfuscating situations where one or more mirror legs are in sync without all of the mirror legs being in sync.

In response to storing the first data to the first page of the second plurality of pages, the first page state is updated to the clean-sync state (block 345). In an example, in response to mirror engine 140 storing data 280C in updated page 255D in persistent memory 150B, page state 265 is updated to the clean-sync state. In a further example, a second write fault is detected associated with the page 250A of pages 250A-255A, and in response to detecting the second write fault, the mirror engine 140 further executes to: update page state 260 to the dirty-nosync state; commit second data to the page 250A of persistent memory 150A; update page state 260 to the clean-nosync state; copy the second data to page 250B of persistent memory 150B; and update page state 260 to the clean-sync state.

In an example, one or more of host 110, operating system 115, application 140, persistent memory 150A, and persistent memory 150B may experience a failure. In such an example, mirror engine 140 may attempt to recover from the failure by copying data (e.g., data 280B and 280C) between persistent memories 150A and 150B based on an associated page state (e.g., page state 265 in mirror state log 165). In an example, mirror engine 140 may be triggered to reconcile data based on host 110 restarting (e.g., based on operating system 115 booting up). In another example, mirror engine 140 may be triggered to reconcile data between persistent memory 150A and persistent memory 150B based on application 145 being initialized. In an example initializing application 145 and/or operating system 115 may trigger a memory fault such as a read or write fault. In an example, mirror engine 140 executes to determine a first current state of page state 291C and a second current state of page state 292B. In the example, in response to determining that page state 291C is in the clean-nosync state, mirror engine 140 copies a first contents of the page 271A on persistent memory 150A to the page 271B on persistent memory 150B. In response to determining that page state 292B is in the dirty-nosync state, mirror engine 140 copies a second contents of the page 272B on persistent memory 150B to page 272A on persistent memory 150A.

In an example, mirror engine 140 restores a contents of page 250B on persistent memory 150B to the page 250A on persistent memory 150A in response to application 145 experiencing a memory fault. In an example, application 145 may experience a memory read fault based on, for example, corruption or physical failure of data stored in page 250A. In such an example, provided that the state of page state 260 is clean-sync, page 250B would have a perfect backup of the data in page 250A allowing page 250A to be recreated and accessed by application 145. If page state 260 is not in a clean-sync state, data may be lost as the validity of data in page 250B may be in question. However, in a system with multiple mirrored copies and an extended mirror state log 165 covering sub-states of clean-nosync to show the synchronization states of individual mirrors, a valid copy of the data may be found and copied to persistent memory 150A as well as the other mirrors. In another example, application 145 may encounter a write fault based on mirror engine 140 attempting to copy contents from page 250A to page 250B. In such an example, page state 260 would not be updated to the clean-nosync state, prompting mirror engine 140 to retry. In an example, a storage controller associated with persistent memory 150B may first attempt to clear the error associated with the writing of page 250B. In the example, if the error is not clearable by electronic means, the storage controller may instead reallocate a different sector of physical storage on persistent memory 150B as a new location for page 250B to allow mirror engine 140 to perform the copy.

Figure 4:
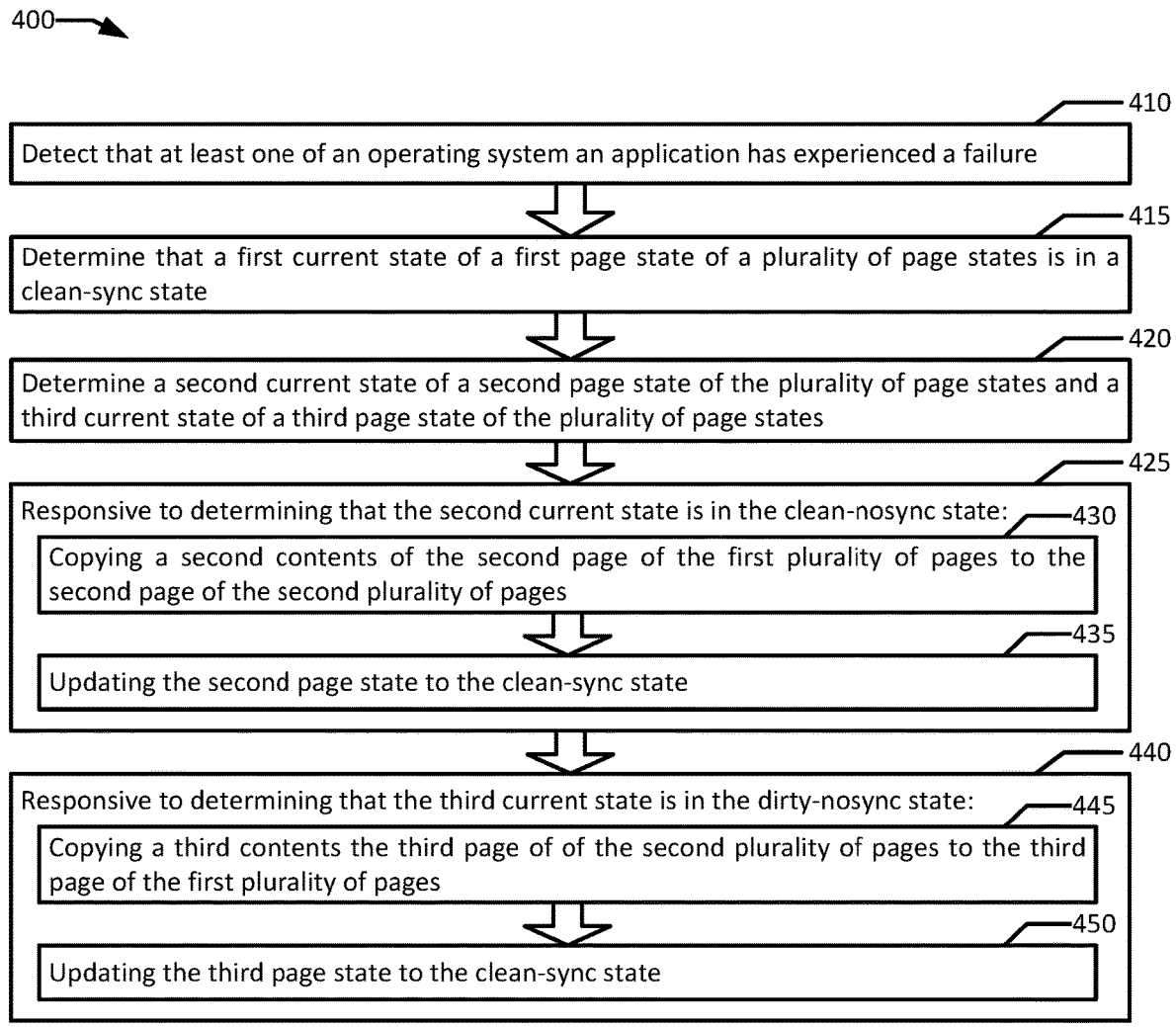
FIG. 4 is a flowchart illustrating an example of data recovery with mirrored byte addressable storage according to an example of the present disclosure.

FIG. 4 is a flowchart illustrating an example of data recovery with mirrored byte addressable storage according to an example of the present disclosure. Although the example method 400 is described with reference to the flowchart illustrated in FIG. 4, it will be appreciated that many other methods of performing the acts associated with the method 400 may be used. For example, the order of some of the blocks may be changed, certain blocks may be combined with other blocks, and some of the blocks described are optional. The method 400 may be performed by processing logic that may comprise hardware (circuitry, dedicated logic, etc.), software, or a combination of both. In an example, the method 400 is performed by a mirror engine 140.

Example method 400 may begin with detecting that at least one of an operating system and an application has experienced a failure (block 410). In an example, mirror engine 140 may detect that operating system 115 and/or application 145 has experienced a failure. For example, mirror engine 140 may be notified of such an error through operating system 115 and/or application 145 as operating system 115 and/or application 145 is reinitialized. In another example, mirror engine 140 may detect page states other than clean-sync in mirror state log 165 as mirror engine 140 is initialized.

A first current state of a first page state of a plurality of page states is determined to be in a clean-sync state (block 415). In an example, each page state of the plurality of page states is one of a clean-sync state, a dirty-nosync state, and a clean-nosync state, the first page state in the clean-sync state indicating that a first page of a first plurality of pages of a first persistent memory and a first page of a second plurality of pages of a second persistent memory contain a same first contents. In an example, mirror engine 140 determines that page state 290A is in the clean-sync state, with other possible states including a dirty-nosync state and a clean-nosync state. In an example, page state 290A is in a clean-sync state indicating that the first page of the first plurality of pages (e.g., page 270A of persistent memory 150A) is synchronized with the first page of the second plurality of pages (e.g., page 270B of persistent memory 150B). In the example, page state 292B is in the dirty-nosync state indicating that the second page of the first plurality of pages (e.g., page 272A of persistent memory 150A) is being updated. In the example, page state 291C is in the clean-nosync state indicating that the third page of the second plurality of pages (e.g., page 271B of persistent memory 150B) is being updated with a change in the first page of the first plurality of pages (e.g., page 271A of persistent memory 150A).

A second current state of a second page state of the plurality of page states and a third current state of a third page state of the plurality of page states are determined (block 420). In an example, the second page state is associated with both a second page of the first plurality of pages and a second page of the second plurality of pages and the third page state is associated with both a third page of the first plurality of pages and a third page of the second plurality of pages. In an example, mirror engine 140 determines a second current state of page state 291C and a third current state of page state 292B.

In response to determining that the second current state is in the clean-nosync state, (block 425) additional actions are performed. A second contents of the second page of the first plurality of pages are copied to the second page of the second plurality of pages (block 430). In an example, in response to mirror engine 140 determining that page state 291C is in the clean-nosync state, contents of page 271A of persistent memory 150A are copied to page 271B of persistent memory 150B. The second page state is updated to the clean-sync state (block 435). In an example, mirror engine 140 updates page state 291C to the clean-sync state.

In response to determining that the third current state is in the dirty-nosync state, (block 440) additional actions are performed. A third contents of the third page of the second plurality of pages are copied to the third page of the first plurality of pages (block 445). In an example, in response to mirror engine 140 determining that page state 292B is in the dirty-nosync state, contents of page 272B of persistent memory 150B are copied to page 272A of persistent memory 150A. The third page state is updated to the clean-sync state (block 450). In an example, mirror engine 140 updates page state 292B to the clean-sync state. In an example, operating system 115 and/or application 145 resumes execution after page state 290A, page state 291C, and page state 292B are all in the clean-sync state.

In an example, application 145 executes on CPU 120 to map pages 250A-255A of persistent memory 150A as a data store, where each of pages 250A-255A is flagged as read-only, and application 145 requests to save data 280A to persistent memory 150A, where a state of application 145 includes data 280A. In an example, mirror engine 140 executes to detect a write fault associated with page 255A of pages 250A-255A, where the write fault is based on application 145 requesting to update data 280A to page 255A. In the example, mirror engine 140 updates page state 265 to a dirty-nosync state. Mirror engine 140 receives a notice of a flush operation of processor cache 122 associated with data 280A, where a value of data 280A is restricted from being updated in the pages 250A-255A during the flush operation and data 280A becomes persistent in page 255A of pages 250A-255A after completion of the flush operation. In an example, mirror engine 140 updates page state 265 to the clean-nosync state. In the example, mirror engine 140 copies data 280A to page 255B of pages 250B-255B. In the example, mirror engine 140 updates page state 265 to the clean-sync state.

In an example, mirror engine 140 restores a contents of page 250B on persistent memory 150B to the page 250A on persistent memory 150A in response to application 145 experiencing a memory fault. In an example, application 145 may experience a memory read fault based on, for example, corruption or physical failure of data stored in page 250A. In such an example, provided that the state of page state 260 is clean-sync, page 250B would have an accurate backup of the data in page 250A allowing page 250A to be recreated and accessed by application 145. If page state 260 is not in a clean-sync state, data may be lost as the validity of data in page 250B may be in question. However, in a system with multiple mirrored copies and an extended mirror state log 165 covering sub-states of clean-nosync to show the synchronization states of individual mirrors, a valid copy of the data may be found and copied to persistent memory 150A as well as the other mirrors. In another example, application 145 may encounter a write fault based on mirror engine 140 attempting to copy contents from page 250A to page 250B. In such an example, page state 260 would not be updated to the clean-nosync state, prompting mirror engine 140 to retry. In an example, a storage controller associated with persistent memory 150B may first attempt to clear the error associated with the writing of page 250B. In the example, if the error is not clearable by electronic means, the storage controller may instead reallocate a different sector of physical storage on persistent memory 150B as a new location for page 250B to allow mirror engine 140 to perform the copy.

In an example, mirror engine 140 may attempt to recover from different types of errors in host 110, operating system 115, application 145, persistent memory 150A, and/or persistent memory 150B. For example, a power failure affecting host 110, and therefore operating system 115 and application 145 may be recovered from by having mirror engine 140 restore the latest known durable state of each page in persistent memory 150A and persistent memory 150B. In such an example, no action is required for clean-sync page states, the data in persistent memory 150B is kept in dirty-nosync page states, while the data in persistent memory 150A is kept in clean-nosync page states.

Alternatively, since persistent memory (e.g., persistent memories 150A-B, 160) is typically accessed through a memory interface, and typically includes a DRAM component, persistent memories 150A-B may experience a memory failure (e.g., memory error, media error) of the storage device itself, typically known as a "poisoned memory" scenario. Such memory errors may be "soft" (transient), or "hard" (permanent). For example, the state of a bit in DRAM, which may typically be stored in the form of an electrical charge, may be flipped (e.g., 0 to 1, 1 to 0) due to a foreign source of energy (e.g., electrical surge, radiation) or a random error in the electrical hardware of the system, resulting in corrupted data and a soft memory error. In a typical example, a soft memory error does not result in damage to the physical device (e.g., persistent memory 150A-B) but only to the data stored in the device. In an example, a hard memory error may occur when a memory cell becomes physically degraded, thereby becoming inaccessible and/or unreliable. In an example, a hard memory error may be associated with a memory cell that may be, for example, readable but not writeable. In another example, a hard memory error may be associated with a memory cell that has experienced multiple soft memory errors.

In an example, a poisoned memory type memory error may be encountered by application 145 when application 145 attempts to access persistent memory 150, either on a read or a write instruction, resulting in a read fault or a write fault. For example, application 145 may attempt to read a page that has experienced a page 270A in the clean-sync state 290A, but may receive nonsensical data indicating corruption of the contents of page 270A. In such a scenario, mirror engine 140 may be notified to recover from the read fault, for example, by copying the contents of page 270B to persistent memory 150A. In the case of a soft memory error, the same memory sector storing the defective page 270A may be overwritten. In the case of a hard memory error, a storage controller for persistent memory 150A may allocate a new sector of memory for storing the restored page 270A. In an example, a memory error in page 272A may occur while page state 292B is in the dirty-nosync state, for example, if a memory sector storing page 272A in persistent memory 150A experiences a failure while page 272A is being written. In such a scenario, mirror engine 140 may be notified, and may restore the contents of page 272B to persistent memory 150A to correct for a possibly partially updated page 272A. However, data would be lost because the data being committed to the updated page 272A would not be reflected yet in mirror copy 272B. In an example, if application 145 experiences a read fault while loading page 271A in the clean-nosync state, for example, after experiencing an application crash, data may be lost. In the example, the mirror copy of the data in page 271B may be out of date as indicated by the clean-nosync state, but may be the only accessible copy of the page.

In an example, mirror engine 140 may also encounter media errors, either during initialization or during recovery operations. In an example, a read fault on pages of persistent memory 150A by mirror engine 140 may indicate a necessary correction, for example by copying a corresponding mirrored page in persistent memory 150B. In such examples, clean-nosync states are easily addressed, but both clean-nosync and dirty-nosync states likely result in some data loss since the backup copy on persistent memory 150B would be out of date. A system implementing multiple mirror legs, with an extended page state log 165 allowing for the recording of the states of individual mirror legs, may be capable of recovering from such a failure without data loss if at least one mirror copy on one mirror leg was successful. In an example, if mirror engine 140 encounters a write fault while either initially updating a page to mirror leg persistent memory 150B or recovering to primary leg persistent memory 150A, the write may be reattempted since the source is intact. In another example, if mirror engine 140 instead encounters a read fault in either nosync state, there is an indication of an issue with the source data as well as the destination data, and therefore data loss is a likely result. For example, if data in page 272B is required for recovery and such data is inaccessible, recovery may be possible only with a secondary mirror copy of the data.

Figure 5:
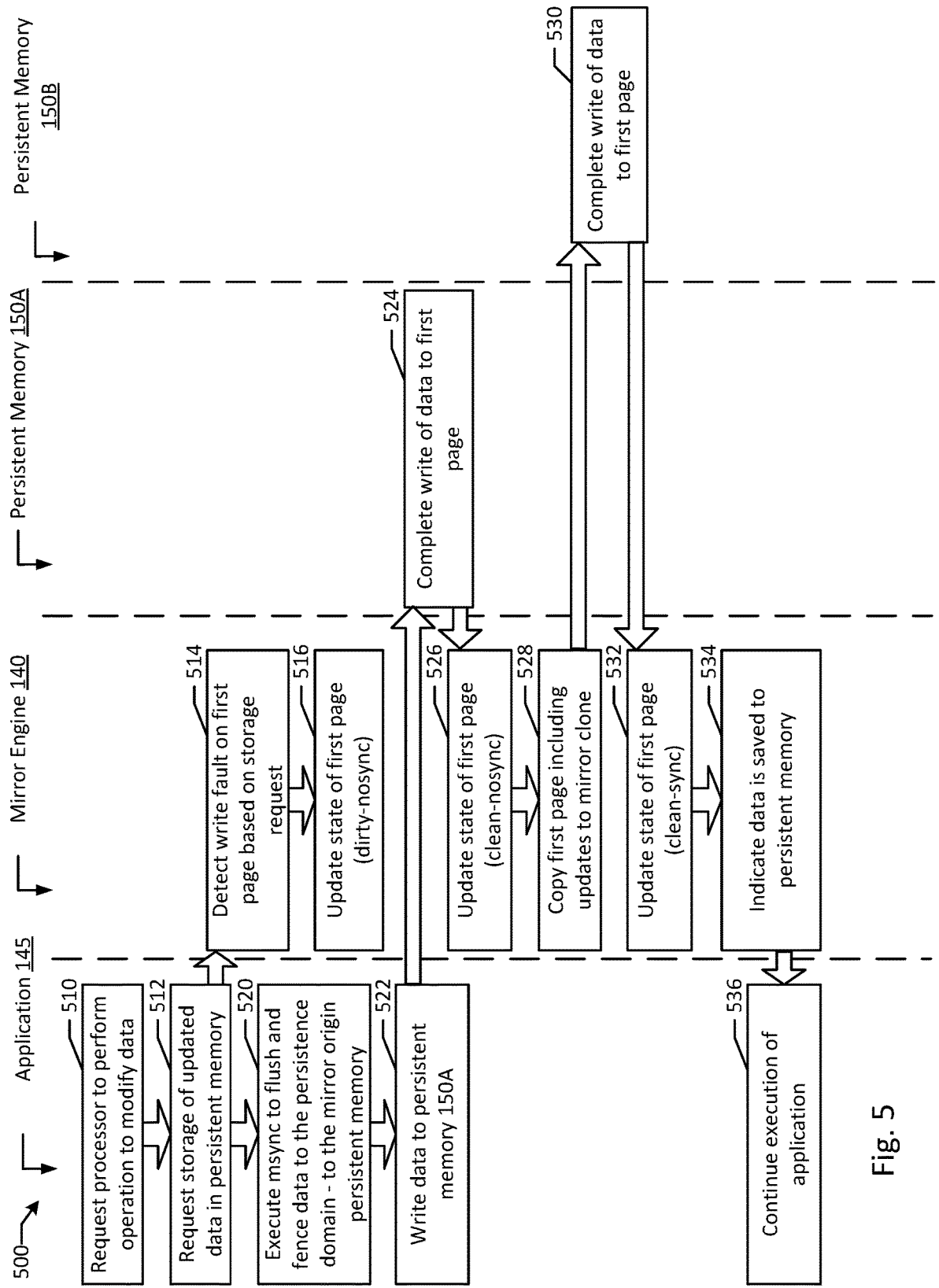
FIG. 5 is flow diagram of an example of mirrored byte addressable storage according to an example of the present disclosure.

FIG. 5 is flow diagram of an example of mirrored byte addressable storage according to an example of the present disclosure. Although the examples below are described with reference to the flowchart illustrated in FIG. 5, it will be appreciated that many other methods of performing the acts associated with FIG. 5 may be used. For example, the order of some of the blocks may be changed, certain blocks may be combined with other blocks, and some of the blocks described are optional. The methods may be performed by processing logic that may comprise hardware (circuitry, dedicated logic, etc.), software, or a combination of both. In illustrated example 500, application 145's data is mirrored by mirror engine 140 between persistent memories 150A and 150B.

In example system 500, application 145 requests processor 120 to perform an operation to modify data (block 510). In an example, application 145 also requests storage of the updated data in persistent memory (block 512). In an example, mirror engine 140 detects a write fault on page 255A based on the storage request by application 145 (block 514). For example, mirror engine 140 may be notified of the write fault by operating system 115. In an example, mirror engine 140 transitions page state 265 associated with page 255A to the dirty-nosync state (block 516). In an example, application 145 executes msync to flush and fence data (e.g., from CPU cache 122) to the primary mirror leg or mirror origin (e.g., persistent memory 150A) of the persistence domain (block 520). In an example, application 145 requests the writing of the data to persistent memory 150A, specifically page 255A (block 522). In an example, persistent memory 150A completes the writing of the data to page 255A (block 524). In an example, flushing data to persistent memory 150A includes confirming the writing of the data to persistent memory 150A, during which period page state 265 transitions from dirty-nosync to clean-nosync. In an example, mirror engine 140 updates page state 265 to clean-nosync, confirming the storage of data 280A as data 280B in updated page 255C (block 526). In an example, the flush operation initiated by msync additionally includes mirror engine 140 replicating the data stored in page 255A. In an example, mirror engine 140 then copies page 255C including updated data 280B to page 255B of persistent memory 150B as data 280C (block 528). In an example, persistent memory 150B completes writing data 280C to page 255B (block 530). In an example, to commit the write of page 255B into page 255D, mirror engine 140 may execute a second flush of data out of CPU cache 122. Additional flushes corresponding to additional mirror legs may also be performed. In an example, with updates to page 255D confirmed, mirror engine 140 may update state 265 to the clean-sync state (block 532). In an example, mirror engine 140 confirms to operating system 115 and/or application 145 that the data is saved to persistent memories 150A-B (block 534). In an example, application 145 continues execution (block 536).

In an example, application 145 may update multiple pages (e.g., pages 250A and 251A) at once. In such examples, the order of recovery and the data structures used to implement state tracking will dictate the data consistency guarantees. For example, if an msync is performed on an address range that includes two pages 250A and 251A, the order of operations could proceed in one of several different ways.

In a first example, pages 250A and 251A may both be flushed and fenced, for example, by an msync call on both pages. After the flush and fence, mirror engine 140 may update both page states 260 and 261 to clean-nosync. Mirror engine 140 may then subsequently and asynchronously copy pages 250A and 251A to pages 250B and 251B to perform replication, but only commit the writes as durable after both pages 250B and 251B complete updating. This process, known as "failure atomic msync," allows for consistent roll back to a starting state (e.g., state before application 145 attempted the updates) if there is a failure during the initial commits on pages 250A and 251A, or a seamless recovery moving forwards if the commits resulting in clean-nosync states on page states 260 and 261 are complete.

In a second example, pages 250A and 251A may both be flushed and fenced, for example, by an msync call on both pages. After the flush and fence, mirror engine 140 may update both page states 260 and 261 to clean-nosync. Mirror engine 140 may then subsequently copy pages 250A and 251A to pages 250B and 251B to perform replication, committing each copy with a flush and fence operation on pages 250B and 251B individually as each respective update is completed. As a result, each page is updated atomically, and each update is committed potentially sooner, but a roll back may end up with an intermediary erroneous state if one of the pages was not finished updating. In the example, if a failure occurs before both primary leg pages are durable, page states 260 and 261 may both be dirty-nosync, and therefore a proper recovery procedure may be to roll back the changes. However, if failure occurs after both primary leg pages are made durable, then page states 260 and 261 may be in a hybrid clean-nosync and clean-sync state with a later failure. For example, if page 250B has completed mirror replication of page 250A, then page state 260 would be clean-sync, however, at the time page 250B completes replication, page 251B may not yet have completed replication and therefore page state 261 may be in the clean-nosync state still. In a third example, pages 250A and 251A may be flushed and fenced independently, each page triggering mirror engine 140 to replicate that page individually as that page becomes ready. The third example results in similar consistency guarantees as the second example, except for the additional possibility of dirty-nosync states being mixed with clean-nosync and clean-sync based on the additional possible timing scenarios.

Other mechanisms and permutations exist, and the chosen method will depend on design requirements. Assuming that each page is sized and aligned with a logical block size exported by the storage device, any of the above examples will result in atomic sector updates, which many applications, especially legacy applications, rely on. As a result, mirrored byte addressable storage is compatible with both persistent memory-aware as well as legacy applications, allowing for smooth deployment in legacy and hybrid environments. In an example, many legacy file system implementations that support direct access support it only for data. File system metadata is generally still issued using the traditional block layer interfaces. The mirror engine 140, to be legacy compliant, may also support tracking dirty regions via a block I/O code path. With such implementations, a successful msync will ensure that both metadata and data are durable on all mirror legs upon completion. For example, msync in such systems may first commit data pages to non-volatile storage (e.g., persistent memory), for example, by forcing any lingering data out of CPU caches and into persistent memory via a flush command. After the data is durable from the subsequent fence command as part of the msync, the file system may issue log or metadata writes using legacy block interfaces. Once the log writes are complete, a separate barrier or fence request is sent to the storage driver. Upon receiving the barrier request, the mirror engine 140 will copy the dirty regions to the mirror legs as outlined above. Alternatively, the block regions may be synchronized inside of a block submission code path.

Figure 6:
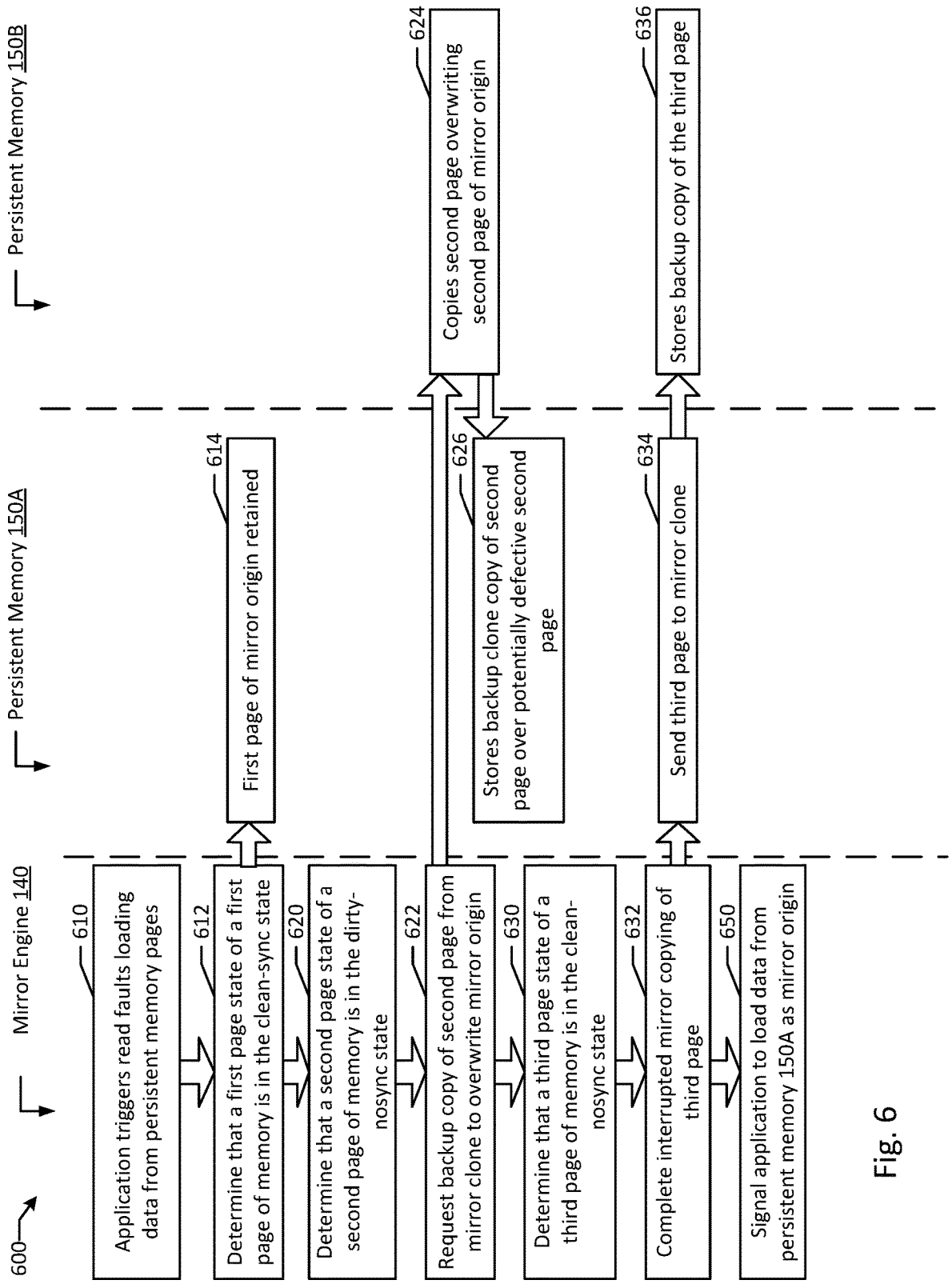
FIG. 6 is a flow diagram of an example of data recovery with mirrored byte addressable storage according to an example of the present disclosure.

FIG. 6 is a flow diagram of an example of data recovery with mirrored byte addressable storage according to an example of the present disclosure. Although the examples below are described with reference to the flowchart illustrated in FIG. 6, it will be appreciated that many other methods of performing the acts associated with FIG. 6 may be used. For example, the order of some of the blocks may be changed, certain blocks may be combined with other blocks, and some of the blocks described are optional. The methods may be performed by processing logic that may comprise hardware (circuitry, dedicated logic, etc.), software, or a combination of both. In illustrated example 600, mirror engine 140 recovers and resynchronizes data between persistent memory 150A and persistent memory 150B after a failure.

In example system 600, mirror engine 140 is initialized during a boot-up sequence of host 110, including operating system 115 (block 610). In an example, mirror engine 140 inspects mirror state log 165 upon initialization for states other than clean-sync for initialization recovery clean up purposes. In an example, states other than clean-sync in mirror state log 165 may indicate that either operating system 115 or application 145 experienced a failure. In some examples, an initialization of application 145 may trigger an inspection and cleanup of pages of persistent memory 150A mapped to application 145 by mirror engine 140. In some examples, initialization of mirror engine 140 may be tied to application 145, for example, instead of operating system 115 or host 110.

In an example, mirror engine 140 determines that that page state 290A is in the clean-sync state (block 612). In the example, the page 270A is retained on persistent memory 150A (block 614). In an example, mirror engine 140 determines that page state 292B is in the dirty-nosync state indicating that a failure occurred while the second page of the first plurality of pages (e.g., page 272A of persistent memory 150A) was being updated (block 620). In an example, page state 292B in the dirty-nosync state may be indicative of application 145 experiencing a write fault prior to crashing. In the example, mirror engine 140 requests the backup copy of page 272A (e.g., page 272B) from mirror clone persistent memory 150B to overwrite mirror origin persistent memory 150A (block 622). In an example, persistent memory 150B copies page 272B overwriting page 272A in mirror origin persistent memory 150A (block 624). In the example, persistent memory 150A stores backup clone copy page 272B over potentially defective page 272A (block 626). In an example, mirror engine determines that page state 291C is in the clean-nosync state indicating that the third page of the second plurality of pages (e.g., page 271B of persistent memory 150B) was being updated with a change in the first page of the first plurality of pages (e.g., page 271A of persistent memory 150A) when a failure occurred (block 630). In the example, mirror engine 140 requests completion of the interrupted mirror copying of page 271A (block 632). In the example, persistent memory 150A sends page 271A to mirror clone persistent memory 150B (block 634). In an example, persistent memory 150B stores backup copy page 271B (block 636). In an example, mirror engine 140 signals application 145 to resume loading data from persistent memory 150A as the mirror origin or primary leg (block 650).

In an example, a mirrored byte addressable storage system may experience logical or power failures, where the page state of each page dictates which direction if any data should be transferred in a recovery operation. In an example, a mirrored byte addressable storage system may also experience break media errors, where the data contents of a persistent memory (e.g., persistent memories 150A-B) is either physically or electronically damaged after becoming durable. Break media errors may manifest during mirror engine 140, application 145, or operating system 115 initialization. In each case, as the primary mirror leg is typically the one being directly accessed, if the corresponding page state to the page generating an error is clean-sync or dirty-nosync, a secondary mirror leg copy of the data may be used for restoration. In cases where the page state is clean-nosync, data from the primary leg may effectively have been lost, and restoration may only be possible in systems with multiple secondary legs and expanded mirror state logs. However, in a dirty-nosync scenario, if a read error manifests in trying to load data for restoration from the secondary leg, then the page is effectively lost because retaining the dirty data on the primary leg would effectively break the atomicity guarantee for data integrity purposes. In a typical example, if a memory error occurs during a read operation, the operating system 115 will attempt to unmap the page for the user's address space, causing further attempts to access the page to trigger a page fault that can be trapped to mirror engine 140. In such a scenario, a SIGBUS message may be delivered to application 145 to retry to faulty memory load, allowing mirror engine 140 to attempt to repair the issue in the interim. If operating system 115 fails to unmap the page (e.g., a restricted exception), application 145 is responsible for unmapping and remapping such faulty pages. Errors in the secondary mirror legs may be detected during recovery operations, or alternatively, mirror engine 140 may register to receive error reports from system scans, for example, by operating system 115, and mirror engine 140 may asynchronously repair such errors as they appear.

Figure 7:
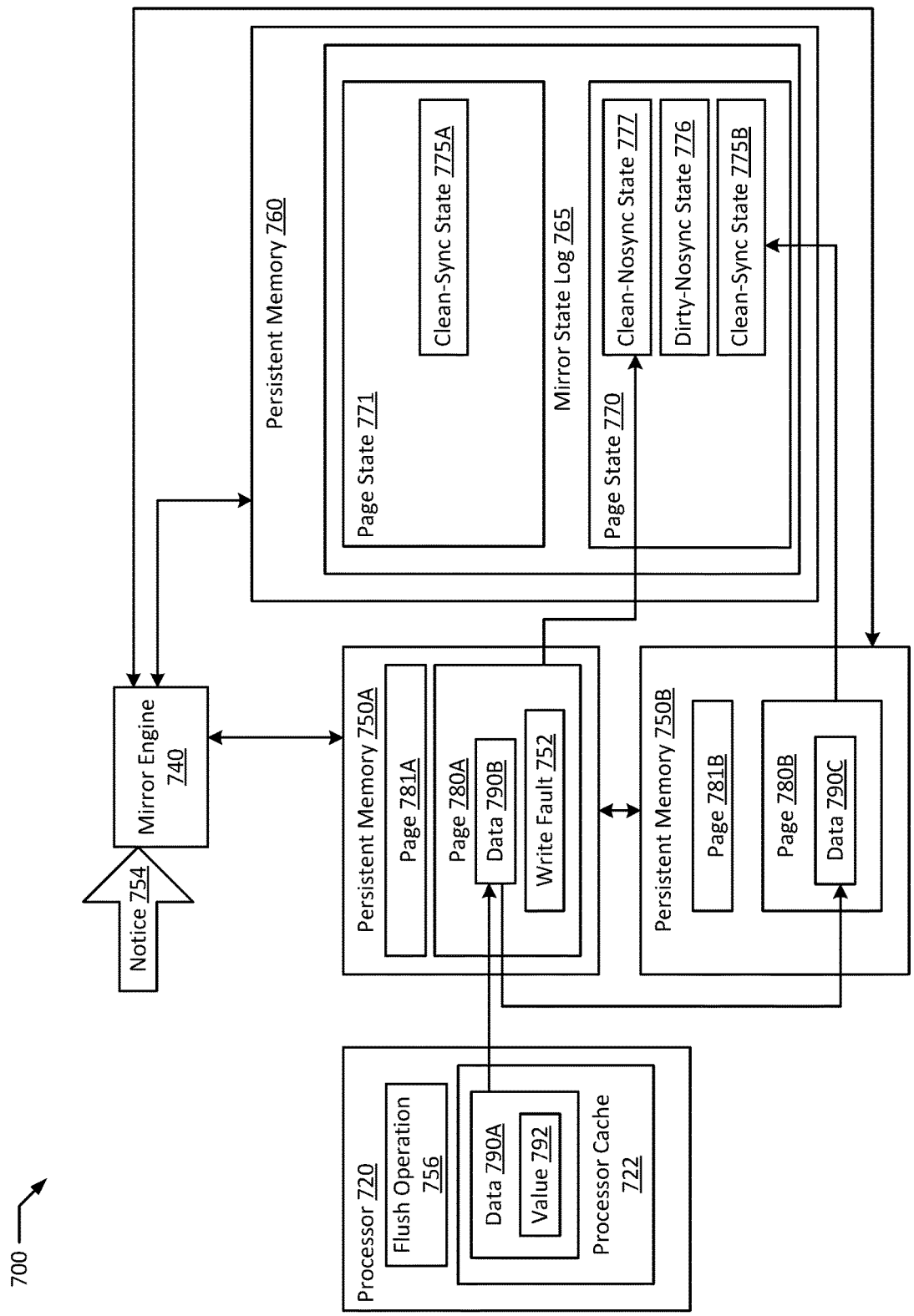
FIG. 7 is a block diagram of an example mirrored byte addressable storage system according to an example of the present disclosure.

FIG. 7 is a block diagram of an example mirrored byte addressable storage system according to an example of the present disclosure. Example system 700 includes persistent memories 750A-B and 760, where mirror state log 765 is stored in persistent memory 760 and mirror state log 765 stores page state 770 associated with both pages 780A and 780B, and page state 771 associated with both pages 781A and 781B. Mirror engine 740 executes on processor 720 and processor cache 722 is associated with processor 720. A write fault 752 associated with page 780A is detected and in response, page state 770 is updated to dirty-nosync state 776, where page states 770 and 771 are in clean-sync states 775A-B, dirty-nosync state 776, or clean-nosync state 777. Notice 754 of a flush operation 756 of processor cache 722 associated with data 790A is received, where value 792 of data 790A is restricted from being updated to 780A-781A during flush operation 756 and first data 790A becomes persistent in page 780A as data 790B after completion of flush operation 756. In response to data 790A being written to page 780A, page state 770 is updated to clean-nosync state 777. In response to updating page state 770 to clean-nosync state 777, data 790B is copied to page 780B. In response to storing data 790B to page 780B as data 790C, page state 770 is updated to clean-sync state 775B.

Figure 8:
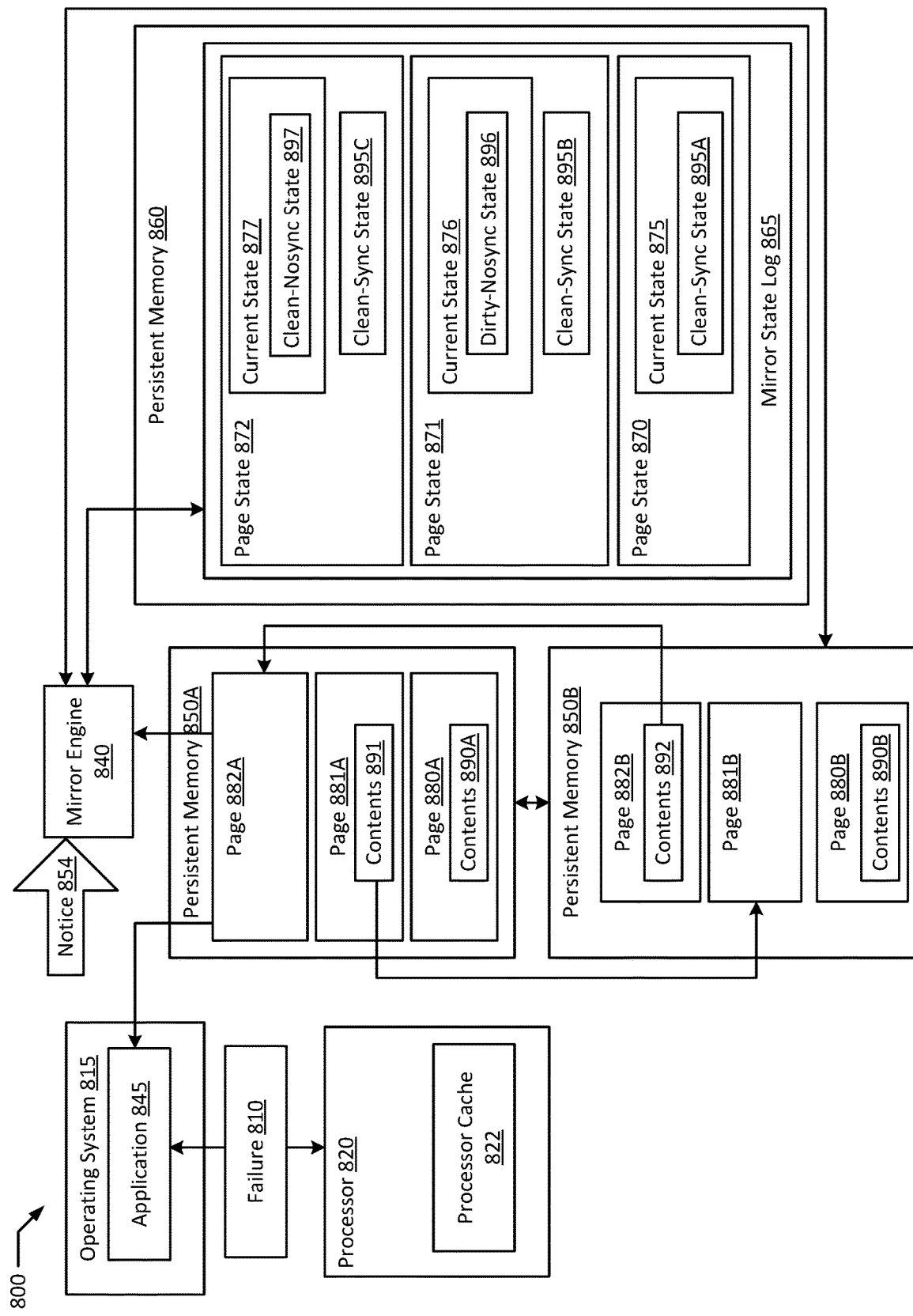
FIG. 8 is a block diagram of data recovery in a mirrored byte addressable storage system according to an example of the present disclosure.

FIG. 8 is a block diagram of data recovery in a mirrored byte addressable storage system according to an example of the present disclosure. Example system 800 includes persistent memories 850A-B and 860, where mirror state log 865 is stored in persistent memory 860 and mirror state log 865 stores page state 870 associated with both pages 880A and 880B, page state 871 associated with both pages 881A and 881B, and page state 872 associated with both pages 881A and 881B. Mirror engine 840 executes on processor 820 and processor cache 822 is associated with processor 820. Page states 870-872 are in clean-sync states 895A-C, dirty-nosync state 897, or clean-nosync state 896. Operating system 815 and/or application 845 associated with processor 820 is detected to have experienced a failure 810. Current state 875 of page state 870 is determined to be in clean-sync state 895A, where page state 870 in clean-sync state 895A indicates that pages 880A and 880B contain a same contents 890A and 890B respectively. Current state 876 of page state 871 and current state 877 of page state 872 are determined. In response to determining that current state 876 is in clean-nosync state 897, contents 891 of page 881A are copied to page 881B. Page state 876 is updated to clean-sync state 895C. In response to determining that current state 877 is in dirty-nosync state 896, contents 892 of page 882B are copied to page 882A. Page state 872 is updated to clean-sync state 895B. Operating system 815 and/or application 845 resumes execution after page states 870-872 are all in clean-sync states 895A-C.

It will be appreciated that all of the disclosed methods and procedures described herein can be implemented using one or more computer programs or components. These components may be provided as a series of computer instructions on any conventional computer readable medium or machine readable medium, including volatile or non-volatile memory, such as RAM, ROM, flash memory, magnetic or optical disks, optical memory, or other storage media. The instructions may be provided as software or firmware, and/or may be implemented in whole or in part in hardware components such as ASICs, FPGAs, DSPs or any other similar devices. The instructions may be executed by one or more processors, which when executing the series of computer instructions, performs or facilitates the performance of all or part of the disclosed methods and procedures.

Aspects of the subject matter described herein may be useful alone or in combination with one or more other aspects described herein. In a 1st exemplary aspect of the present disclosure, a system comprises: a first persistent memory, a second persistent memory, and a third persistent memory, wherein a mirror state log is stored in the third persistent memory and the mirror state log stores a plurality of page states associated with a first respective plurality of pages of the first persistent memory and a second respective plurality of pages of the second persistent memory, including a first page state associated with both a first page of the first plurality of pages and a first page of the second plurality of pages, and a second page state associated with both a second page of the first plurality of pages and a second page of the second plurality of pages; one or more processors, including a processor cache associated with the one or more processors; and a mirror engine executing on the one or more processors to: detect a first write fault associated with the first page of the first plurality of pages; responsive to detecting the first write fault: update the first page state to a dirty-nosync state, wherein each page state of the plurality of page states is one of a clean-sync state, the dirty-nosync state, and a clean-nosync state; receive a notice of a flush operation of the processor cache associated with first data, wherein a value of the first data is restricted from being updated to the first plurality of pages during the flush operation and the first data becomes persistent in the first page of the first plurality of pages after completion of the flush operation; and responsive to the first data being written to the first page of the first plurality of pages: update the first page state to the clean-nosync state; responsive to updating the first page state to the clean-nosync state, copying the first data to the first page of the second plurality of pages; and responsive to storing the first data to the first page of the second plurality of pages, updating the first page state to the clean-sync state.

In accordance with a 2nd exemplary aspect of the present disclosure, which may be used in combination with any one or more of the preceding aspects (e.g., the 1st aspect), further comprising an application executing on the one or more processors to: map the first plurality of pages as a data store, wherein each page of the first plurality of pages is flagged as read-only; and request to save the first data to the first persistent memory. In accordance with a 3rd exemplary aspect of the present disclosure, which may be used in combination with any one or more of the preceding aspects (e.g., the 1st aspect), wherein a state of the application includes the first data. In accordance with a 4th exemplary aspect of the present disclosure, which may be used in combination with any one or more of the preceding aspects (e.g., the 1st aspect), wherein the first data is copied based on the first page state in response to initializing at least one of an application and an operating system. In accordance with a 5th exemplary aspect of the present disclosure, which may be used in combination with any one or more of the preceding aspects (e.g., the 4th aspect), wherein the first page state (i) in the clean-sync state indicates that the first page of the first plurality of pages is synchronized with the first page of the second plurality of pages, (ii) in the dirty-nosync state indicates that the first page of the first plurality of pages is being updated, and (iii) the clean-nosync state indicates that the first page of the second plurality of pages is being updated with a change in the first page of the first plurality of pages. In accordance with a 6th exemplary aspect of the present disclosure, which may be used in combination with any one or more of the preceding aspects (e.g., the 1st aspect), wherein the mirror engine restores a contents of the first page of the second plurality of pages to the first page of the first plurality of pages in response to an application experiencing a memory fault.

In accordance with a 7th exemplary aspect of the present disclosure, which may be used in combination with any one or more of the preceding aspects (e.g., the 1st aspect), wherein at least one of an operating system executing on the one or more processors and an application executing on the one or more processors fails, and on recovery from failing, the mirror engine executes to: determine a first current state of the first page state and a second current state of the second page state; responsive to determining that the first current state is in the clean-nosync state, copying a first contents of the first page of the first plurality of pages to the first page of the second plurality of pages; responsive to determining that the second current state is in the dirty-nosync state, copying a second contents of the second page of the second plurality of pages to the second page of the first plurality of pages. In accordance with a 8th exemplary aspect of the present disclosure, which may be used in combination with any one or more of the preceding aspects (e.g., the 1st aspect), wherein at least two of the first persistent memory, the second persistent memory, and the third persistent memory share a same physical storage device. In accordance with a 9th exemplary aspect of the present disclosure, which may be used in combination with any one or more of the preceding aspects (e.g., the 1st aspect), wherein the flush operation is part of a memory synchronization operation. In accordance with a 10th exemplary aspect of the present disclosure, which may be used in combination with any one or more of the preceding aspects (e.g., the 9th aspect), wherein the memory synchronization operation additionally includes a change freeze operation to prevent conflicting data updates and a durability operation to commit requested data updates. In accordance with a 11th exemplary aspect of the present disclosure, which may be used in combination with any one or more of the preceding aspects (e.g., the 1st aspect), wherein the first page state is stored as a plurality of Boolean values. In accordance with a 12th exemplary aspect of the present disclosure, which may be used in combination with any one or more of the preceding aspects (e.g., the 1st aspect), wherein a third copy of the first data is stored in a first page of a third plurality of pages on a fourth persistent memory.

In accordance with a 13th exemplary aspect of the present disclosure, which may be used in combination with any one or more of the preceding aspects (e.g., the 1st aspect), wherein a second write fault is detected associated with the second page of the first plurality of pages, and responsive to detecting the second write fault, the mirror engine further executes to: update the second page state to the dirty-nosync state; commit second data to the second page of the first plurality of pages; update the second page state to the clean-nosync state; copy the second data to the second page of the second plurality of pages; and update the second page state to the clean-sync state. In accordance with a 14th exemplary aspect of the present disclosure, which may be used in combination with any one or more of the preceding aspects (e.g., the 1st aspect), wherein the mirror state log is replicated to a fourth persistent memory.

Aspects of the subject matter described herein may be useful alone or in combination with one or more other aspects described herein. In a 15th exemplary aspect of the present disclosure, a method comprises: detecting a first write fault associated with a first page of a first plurality of pages of a first persistent memory; responsive to detecting the first write fault: updating a first page state to a dirty-nosync state, wherein each page state of a plurality of page states including the first page state is one of a clean-sync state, the dirty-nosync state, and a clean-nosync state, and the first page state is associated with the first page of the first plurality of pages and a first page of a second plurality of pages of a second persistent memory; receiving a notice of a flush operation of a processor cache associated with first data, wherein a value of the first data is restricted from being updated to the first plurality of pages during the flush operation and the first data becomes persistent in the first page of the first plurality of pages after completion of the flush operation; and responsive to the first data being written to the first page of the first plurality of pages: updating the first page state to the clean-nosync state; responsive to updating the first page state to the clean-nosync state, copying the first data to the first page of the second plurality of pages; and responsive to storing the first data to the first page of the second plurality of pages, updating the first page state to the clean-sync state.

In accordance with a 16th exemplary aspect of the present disclosure, which may be used in combination with any one or more of the preceding aspects (e.g., the 15th aspect), further comprising: mapping, by an application, the first plurality of pages as a data store; and requesting, by the application, to save the first data to the first persistent memory, wherein a state of the application includes the first data. In accordance with a 17th exemplary aspect of the present disclosure, which may be used in combination with any one or more of the preceding aspects (e.g., the 15th aspect), wherein the first data is copied based on the first page state in response to initializing at least one of an application and an operating system. In accordance with a 18th exemplary aspect of the present disclosure, which may be used in combination with any one or more of the preceding aspects (e.g., the 17th aspect), wherein the first page state (i) in the clean-sync state indicates that the first page of the first plurality of pages is synchronized with the first page of the second plurality of pages, (ii) in the dirty-nosync state indicates that the first page of the first plurality of pages is being updated, and (iii) the clean-nosync state indicates that the first page of the second plurality of pages is being updated with a change in the first page of the first plurality of pages. In accordance with a 19th exemplary aspect of the present disclosure, which may be used in combination with any one or more of the preceding aspects (e.g., the 15th aspect), further comprising: restoring a contents of the first page of the second plurality of pages to the first page of the first plurality of pages in response to an application experiencing a memory fault.

In accordance with a 20th exemplary aspect of the present disclosure, which may be used in combination with any one or more of the preceding aspects (e.g., the 15th aspect), wherein at least one of an operating system and an application fails, and on recovery from failing, the method further comprises: determining a first current state of the first page state and a second current state of a second page state; responsive to determining that the first current state is in the clean-nosync state, copying a first contents of the first page of the first plurality of pages to the first page of the second plurality of pages; responsive to determining that the second current state is in the dirty-nosync state, copying a second contents of the second page of the second plurality of pages to the second page of the first plurality of pages. In accordance with a 21st exemplary aspect of the present disclosure, which may be used in combination with any one or more of the preceding aspects (e.g., the 15th aspect), wherein the flush operation is part of a memory synchronization operation that additionally includes a change freeze operation to prevent conflicting data updates and a durability operation to commit requested data updates. In accordance with a 22nd exemplary aspect of the present disclosure, which may be used in combination with any one or more of the preceding aspects (e.g., the 15th aspect), wherein the first page state is stored as a plurality of Boolean values. In accordance with a 23rd exemplary aspect of the present disclosure, which may be used in combination with any one or more of the preceding aspects (e.g., the 15th aspect), wherein a third copy of the first data is stored in a first page of a third plurality of pages on a third persistent memory.

In accordance with a 24th exemplary aspect of the present disclosure, which may be used in combination with any one or more of the preceding aspects (e.g., the 15th aspect), wherein a second write fault is detected associated with a second page of the first plurality of pages, the method further comprising, responsive to detecting the second write fault: updating a second page state to the dirty-nosync state; committing second data to the second page of the first plurality of pages; updating the second page state to the clean-nosync state; copying the second data to a second page of the second plurality of pages; and updating the second page state to the clean-sync state. In accordance with a 25th exemplary aspect of the present disclosure, which may be used in combination with any one or more of the preceding aspects (e.g., the 15th aspect), wherein the first page state is stored in a mirror state log on a third persistent memory. In accordance with a 26th exemplary aspect of the present disclosure, which may be used in combination with any one or more of the preceding aspects (e.g., the 15th aspect), wherein the mirror state log is replicated to a fourth persistent memory.

Aspects of the subject matter described herein may be useful alone or in combination with one or more other aspects described herein. In a 27th exemplary aspect of the present disclosure, a computer-readable non-transitory storage medium storing executable instructions, which when executed by a computer system, cause the computer system to: detect a first write fault associated with a first page of a first plurality of pages of a first persistent memory; responsive to detecting the first write fault: update a first page state to a dirty-nosync state, wherein each page state of a plurality of page states including the first page state is one of a clean-sync state, the dirty-nosync state, and a clean-nosync state, and the first page state is associated with the first page of the first plurality of pages and a first page of a second plurality of pages of a second persistent memory; receive a notice of a flush operation of a processor cache associated with first data, wherein a value of the first data is restricted from being updated to the first plurality of pages during the flush operation and the first data becomes persistent in the first page of the first plurality of pages after completion of the flush operation; and responsive to the first data being written to the first page of the first plurality of pages: update the first page state to the clean-nosync state; responsive to updating the first page state to the clean-nosync state, copying the first data to the first page of the second plurality of pages; and responsive to storing the first data to the first page of the second plurality of pages, updating the first page state to the clean-sync state.

Aspects of the subject matter described herein may be useful alone or in combination with one or more other aspects described herein. In a 28th exemplary aspect of the present disclosure, a system comprises: a means for detecting a first write fault associated with a first page of a first plurality of pages of a first persistent memory; a means for updating a first page state to a dirty-nosync state responsive to detecting the first write fault, wherein each page state of a plurality of page states including the first page state is one of a clean-sync state, the dirty-nosync state, and a clean-nosync state, and the first page state is associated with the first page of the first plurality of pages and a first page of a second plurality of pages of a second persistent memory; a means for receiving a notice of a flush operation of a processor cache associated with first data, wherein a value of the first data is restricted from being updated to the first plurality of pages during the flush operation and the first data becomes persistent in the first page of the first plurality of pages after completion of the flush operation; and a means for updating the first page state to the clean-nosync state responsive to the first data being written to the first page of the first plurality of pages; a means for copying the first data to the first page of the second plurality of pages responsive to updating the first page state to the clean-nosync state; and a means for updating the first page state to the clean-sync state responsive to storing the first data to the first page of the second plurality of pages.

Aspects of the subject matter described herein may be useful alone or in combination with one or more other aspects described herein. In a 29th exemplary aspect of the present disclosure, a system comprises: a first persistent memory, a second persistent memory, and a third persistent memory, wherein a mirror state log is stored in the third persistent memory and the mirror state log stores a plurality of page states associated with a first respective plurality of pages of the first persistent memory and a second respective plurality of pages of the second persistent memory, including a first page state associated with both a first page of the first plurality of pages and a first page of the second plurality of pages, a second page state associated with both a second page of the first plurality of pages and a second page of the second plurality of pages, a third page state associated with both a third page of the first plurality of pages and a third page of the second plurality of pages and each page state of the plurality of page states is one of a clean-sync state, a dirty-nosync state, and a clean-nosync state; one or more processors, including a processor cache associated with the one or more processors; and a mirror engine configured to execute on the one or more processors to: detect that at least one of an operating system executing on the one or more processors and an application executing on the one or more processors has experienced a failure; determine that a first current state of the first page state is in the clean-sync state, wherein the first page state in the clean-sync state indicates that the first page of the first plurality of pages and the first page of the second plurality of pages contain a same first contents; determine a second current state of the second page state and a third current state of the third page state; responsive to determining that the second current state is in the clean-nosync state: copying a second contents of the second page of the first plurality of pages to the second page of the second plurality of pages; and updating the second page state to the clean-sync state; and responsive to determining that the third current state is in the dirty-nosync state: copying a third contents of the third page of the second plurality of pages to the third page of the first plurality of pages; and updating the third page state to the clean-sync state, wherein the one of the operating system and the application resumes execution after the first page state, the second page state, and the third page state are all in the clean-sync state.

In accordance with a 30th exemplary aspect of the present disclosure, which may be used in combination with any one or more of the preceding aspects (e.g., the 29th aspect), wherein the application executes on the one or more processors to: map the first plurality of pages as a data store, wherein each page of the first plurality of pages is flagged as read-only; and request to save first data to the first persistent memory, wherein a state of the application includes the first data. In accordance with a 31st exemplary aspect of the present disclosure, which may be used in combination with any one or more of the preceding aspects (e.g., the 29th aspect), wherein the mirror engine further executes to: detect a write fault associated with the first page of the first plurality of pages, wherein the write fault is based on the application requesting to update first data; update the first page state to a dirty-nosync state; receive a notice of a flush operation of the processor cache associated with first data, wherein a value of the first data is restricted from being updated in the first plurality of pages during the flush operation and the first data becomes persistent in the first page of the first plurality of pages after completion of the flush operation; update the first page state to the clean-nosync state; copy the first data to the first page of the second plurality of pages; and update the first page state to the clean-sync state.

In accordance with a 32nd exemplary aspect of the present disclosure, which may be used in combination with any one or more of the preceding aspects (e.g., the 29th aspect), wherein the first page state (i) in the clean-sync state indicates that the first page of the first plurality of pages is synchronized with the first page of the second plurality of pages, (ii) in the dirty-nosync state indicates that the first page of the first plurality of pages is being updated, and (iii) the clean-nosync state indicates that the first page of the second plurality of pages is being updated with a change in the first page of the first plurality of pages. In accordance with a 33rd exemplary aspect of the present disclosure, which may be used in combination with any one or more of the preceding aspects (e.g., the 29th aspect), wherein the mirror engine restores a contents of the first page of the second plurality of pages to the first page of the first plurality of pages in response to an application experiencing a memory fault.

Aspects of the subject matter described herein may be useful alone or in combination with one or more other aspects described herein. In a 34th exemplary aspect of the present disclosure, a method comprises: detecting that at least one of an operating system and an application has experienced a failure; determining that a first current state of a first page state of a plurality of page states is in a clean-sync state, wherein each page state of the plurality of page states is one of a clean-sync state, a dirty-nosync state, and a clean-nosync state, the first page state in the clean-sync state indicating that a first page of a first plurality of pages of a first persistent memory and a first page of a second plurality of pages of a second persistent memory contain a same first contents; determining a second current state of a second page state of the plurality of page states and a third current state of a third page state of the plurality of page states, wherein the second page state is associated with both a second page of the first plurality of pages and a second page of the second plurality of pages and the third page state is associated with both a third page of the first plurality of pages and a third page of the second plurality of pages; responsive to determining that the second current state is in the clean-nosync state: copying a second contents of the second page of the first plurality of pages to the second page of the second plurality of pages; and updating the second page state to the clean-sync state; and responsive to determining that the third current state is in the dirty-nosync state: copying a third contents of the third page of the second plurality of pages to the third page of the first plurality of pages; and updating the third page state to the clean-sync state, wherein the one of the operating system and the application resumes execution after the first page state, the second page state, and the third page state are all in the clean-sync state.

In accordance with a 35th exemplary aspect of the present disclosure, which may be used in combination with any one or more of the preceding aspects (e.g., the 34th aspect), further comprising: detecting a write fault associated with the first page of the first plurality of pages, wherein the write fault is based on the application requesting to update first data; updating the first page state to a dirty-nosync state; receiving a notice of a flush operation of a processor cache associated with first data, wherein a value of the first data is restricted from being updated in the first plurality of pages during the flush operation and the first data becomes persistent in the first page of the first plurality of pages after completion of the flush operation; updating the first page state to the clean-nosync state; copying the first data to the first page of the second plurality of pages; and updating the first page state to the clean-sync state.

In accordance with a 36th exemplary aspect of the present disclosure, which may be used in combination with any one or more of the preceding aspects (e.g., the 3th aspect), wherein the first page state (i) in the clean-sync state indicates that the first page of the first plurality of pages is synchronized with the first page of the second plurality of pages, (ii) in the dirty-nosync state indicates that the first page of the first plurality of pages is being updated, and (iii) the clean-nosync state indicates that the first page of the second plurality of pages is being updated with a change in the first page of the first plurality of pages. In accordance with a 37th exemplary aspect of the present disclosure, which may be used in combination with any one or more of the preceding aspects (e.g., the 34th aspect), further comprising: restoring a contents of the first page of the second plurality of pages to the first page of the first plurality of pages in response to an application experiencing a memory fault.

Aspects of the subject matter described herein may be useful alone or in combination with one or more other aspects described herein. In a 38th exemplary aspect of the present disclosure, a computer-readable non-transitory storage medium storing executable instructions, which when executed by a computer system, cause the computer system to: detect that at least one of an operating system and an application has experienced a failure; determine that a first current state of a first page state of a plurality of page states is in a clean-sync state, wherein each page state of the plurality of page states is one of a clean-sync state, a dirty-nosync state, and a clean-nosync state, the first page state in the clean-sync state indicating that a first page of a first plurality of pages of a first persistent memory and a first page of a second plurality of pages of a second persistent memory contain a same first contents; determine a second current state of a second page state of the plurality of page states and a third current state of a third page state of the plurality of page states, wherein the second page state is associated with both a second page of the first plurality of pages and a second page of the second plurality of pages and the third page state is associated with both a third page of the first plurality of pages and a third page of the second plurality of pages; responsive to determining that the second current state is in the clean-nosync state: copy a second contents of the second page of the first plurality of pages to the second page of the second plurality of pages; and update the second page state to the clean-sync state; and responsive to determining that the third current state is in the dirty-nosync state: copy a third contents of the third page of the second plurality of pages to the third page of the first plurality of pages; and update the third page state to the clean-sync state, wherein the one of the operating system and the application resumes execution after the first page state, the second page state, and the third page state are all in the clean-sync state.

To the extent that any of these aspects are mutually exclusive, it should be understood that such mutual exclusivity shall not limit in any way the combination of such aspects with any other aspect whether or not such aspect is explicitly recited. Any of these aspects may be claimed, without limitation, as a system, method, apparatus, device, medium, etc.

It should be understood that various changes and modifications to the example embodiments described herein will The invention is claimed as follows:

1. A method comprising:
   detecting a write fault associated with a first page of a first plurality of pages of a first persistent memory, wherein writing to the first persistent memory bypasses a host bus adapter to write to the first page;
   responsive to detecting the write fault, updating a first page state to a dirty-nosync state, wherein the first page state is associated with the first page of the first plurality of pages and a first page of a second plurality of pages of a second persistent memory;
   receiving a notice of a flush operation associated with data, wherein the data becomes persistent in the first page of the first plurality of pages after completion of the flush operation, wherein the first page state was updated to the dirty-nosync state in a third persistent memory prior to the flush operation associated with the data, and wherein the first persistent memory, the second persistent memory, and the third persistent memory have a temporary power source;
   responsive to the data becoming persistent, updating the first page state to a clean-nosync state;
   copying the data to the first page of the second plurality of pages; and
   responsive to storing the data to the second plurality of pages, updating the first page state to a clean-sync state.

2. The method of claim 1, wherein the first page state (i) in the clean-sync state indicates that the first page of the first plurality of pages is synchronized with the first page of the second plurality of pages, (ii) in the dirty-nosync state indicates that the first page of the first plurality of pages is being updated, and (iii) the clean-nosync state indicates that the first page of the second plurality of pages is being updated with a change in the first page of the first plurality of pages.

3. The method of claim 2, wherein an operating system fails, and on recovery from failing, the method further comprises:
   determining a first current state of the first page state and a second current state of a second page state;
   responsive to determining that the first current state is in the clean-nosync state, copying a first contents of the first page of the first plurality of pages to the first page of the second plurality of pages; and
   responsive to determining that the second current state is in the dirty-nosync state, copying a second contents of a second page of the second plurality of pages to a second page of the first plurality of pages.

4. The method of claim 1, wherein a mirror engine restores a contents of the first page of the second plurality of pages to the first page of the first plurality of pages in response to an application experiencing a memory fault.

5. The method of claim 1, wherein the flush operation is part of a memory synchronization operation that additionally includes a change freeze operation to prevent conflicting data updates and a durability operation to commit requested data updates.

6. A system comprising:
   a first persistent memory, a second persistent memory, and a third persistent memory, wherein the first persistent memory, the second persistent memory, and the third persistent memory have a temporary power source, wherein a mirror state log is stored in the third persistent memory and the mirror state log stores a plurality of page states associated with a first respective plurality of pages of the first persistent memory and a second respective plurality of pages of the second persistent memory, including a first page state associated with both a first page of the first plurality of pages and a first page of the second plurality of pages, and a second page state associated with both a second page of the first plurality of pages and a second page of the second plurality of pages;
   one or more processors, including a processor cache associated with the one or more processors; and
   a mirror engine executing on the one or more processors to:
   detect a first write fault associated with the first page of the first plurality of pages, wherein writing to the first persistent memory bypasses a host bus adapter to write to the first page; and
   responsive to detecting the first write fault:
      update the first page state to a dirty-nosync state, wherein each page state of the plurality of page states is one of a clean-sync state, the dirty-nosync state, and a clean-nosync state;
      receive a notice of a flush operation of the processor cache associated with first data, wherein a value of the first data is restricted from being updated to the first plurality of pages during the flush operation and the first data becomes persistent in the first page of the first plurality of pages after completion of the flush operation, and the first page state was updated to the dirty-nosync state in the third persistent memory prior to the flush operation associated with the first data; and
      responsive to the first data being written to the first page of the first plurality of pages:
         update the first page state to the clean-nosync state;
         responsive to updating the first page state to the clean-nosync state, copying the first data to the first page of the second plurality of pages; and
         responsive to storing the first data to the first page of the second plurality of pages, updating the first page state to the clean-sync state.

7. The system of claim 6, further comprising an application executing on the one or more processors to:
   map the first plurality of pages as a data store, wherein each page of the first plurality of pages is flagged as read-only; and
   request to save the first data to the first persistent memory, wherein a state of the application includes the first data.

8. The system of claim 6, wherein the first page state (i) in the clean-sync state indicates that the first page of the first plurality of pages is synchronized with the first page of the second plurality of pages, (ii) in the dirty-nosync state indicates that the first page of the first plurality of pages is being updated, and (iii) the clean-nosync state indicates that the first page of the second plurality of pages is being updated with a change in the first page of the first plurality of pages.

9. The system of claim 6, wherein the mirror engine restores a contents of the first page of the second plurality of pages to the first page of the first plurality of pages in response to an application experiencing a memory fault.

10. The system of claim 6, wherein an operating system executing on the one or more processors fails, and on recovery from failing, the mirror engine executes to:

determine a first current state of the first page state and a second current state of the second page state;

responsive to determining that the first current state is in the clean-nosync state, copying a first contents of the first page of the first plurality of pages to the first page of the second plurality of pages; and responsive to determining that the second current state is in the dirty-nosync state, copying a second contents of the second page of the second plurality of pages to the second page of the first plurality of pages.

11. The system of claim 6, wherein the flush operation is part of a memory synchronization operation that additionally includes a change freeze operation to prevent conflicting data updates and a durability operation to commit requested data updates.

12. The system of claim 6, wherein the first page state is stored as a plurality of Boolean values.

13. The system of claim 6, wherein a third copy of the first data is stored in a first page of a third plurality of pages on a fourth persistent memory.

14. The system of claim 6, wherein a second write fault is detected associated with the second page of the first plurality of pages, and responsive to detecting the second write fault, the mirror engine further executes to:
update the second page state to the dirty-nosync state;
commit second data to the second page of the first plurality of pages;
update the second page state to the clean-nosync state;
copy the second data to the second page of the second plurality of pages; and
update the second page state to the clean-sync state.

15. The system of claim 6, wherein the mirror state log is replicated to a fourth persistent memory.

16. A system comprising:
a first persistent memory, a second persistent memory, and a third persistent memory, wherein the first persistent memory, the second persistent memory, and the third persistent memory have a temporary power source, wherein a mirror state log is stored in the third persistent memory and the mirror state log stores a plurality of page states associated with a first respective plurality of pages of the first persistent memory and a second respective plurality of pages of the second persistent memory, including a first page state associated with both a first page of the first plurality of pages and a first page of the second plurality of pages, a second page state associated with both a second page of the first plurality of pages and a second page of the second plurality of pages, a third page state associated with both a third page of the first plurality of pages and a third page of the second plurality of pages and each page state of the plurality of page states is one of a clean-sync state, a dirty-nosync state, and a clean-nosync state, and wherein writing to the first persistent memory bypasses a host bus adapter to write to the first page;
one or more processors, including a processor cache associated with the one or more processors; and
a mirror engine configured to execute on the one or more processors to:
detect that an operating system executing on the one or more processors has experienced a failure;
determine that a first current state of the first page state is in the clean-sync state, wherein the first page state in the clean-sync state indicates that the first page of the first plurality of pages and the first page of the second plurality of pages contain a same first contents;
determine a second current state of the second page state and a third current state of the third page state, wherein the third current state of the third page state was updated to the dirty-nosync state in the third persistent memory prior to a flush operation associated with data being written to the third page of the first plurality of pages; and
responsive to determining that the second current state is in the clean-nosync state:
copying a second contents of the second page of the first plurality of pages to the second page of the second plurality of pages; and
updating the second page state to the clean-sync state; and
responsive to determining that the third current state is in the dirty-nosync state:
copying a third contents of the third page of the second plurality of pages to the third page of the first plurality of pages; and
updating the third page state to the clean-sync state,
wherein the operating system resumes execution after the first page state, the second page state, and the third page state are all in the clean-sync state.

17. The system of claim 16, wherein an application executes on the one or more processors to:
map the first plurality of pages as a data store, wherein each page of the first plurality of pages is flagged as read-only; and
request to save first data to the first persistent memory, wherein a state of the application includes the first data.

18. The system of claim 16, wherein the mirror engine further executes to:
detect a write fault associated with the first page of the first plurality of pages, wherein the write fault is based on an application requesting to update first data;
update the first page state to the dirty-nosync state;
receive a notice of a flush operation of the processor cache associated with the first data, wherein a value of the first data is restricted from being updated in the first plurality of pages during the flush operation and the first data becomes persistent in the first page of the first plurality of pages after completion of the flush operation;
update the first page state to the clean-nosync state;
copy the first data to the first page of the second plurality of pages; and
update the first page state to the clean-sync state.

19. The system of claim 16, wherein the first page state (i) in the clean-sync state indicates that the first page of the first plurality of pages is synchronized with the first page of the second plurality of pages, (ii) in the dirty-nosync state indicates that the first page of the first plurality of pages is being updated, and (iii) the clean-nosync state indicates that the first page of the second plurality of pages is being updated with a change in the first page of the first plurality of pages.

20. The system of claim 16, wherein the mirror engine restores a contents of the first page of the second plurality of pages to the first page of the first plurality of pages in response to an application experiencing a memory fault.

* * * * *